US011012901B2

(12) United States Patent
Yao et al.

(10) Patent No.: US 11,012,901 B2
(45) Date of Patent: May 18, 2021

(54) WIRELESS COMMUNICATION METHOD AND APPARATUS

(71) Applicant: HUAWEI TECHNOLOGIES CO., LTD., Shenzhen (CN)

(72) Inventors: Chuting Yao, Beijing (CN); Haibo Xu, Beijing (CN); Jian Wang, Beijing (CN); Zhenguo Du, Shenzhen (CN); Zhiming Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/636,535

(22) PCT Filed: Aug. 11, 2017

(86) PCT No.: PCT/CN2017/097276
§ 371 (c)(1),
(2) Date: Feb. 4, 2020

(87) PCT Pub. No.: WO2019/028919
PCT Pub. Date: Feb. 14, 2019

(65) Prior Publication Data
US 2020/0252843 A1    Aug. 6, 2020

(51) Int. Cl.
*H04W 36/00* (2009.01)
*H04W 76/27* (2018.01)
(Continued)

(52) U.S. Cl.
CPC ..... *H04W 36/0058* (2018.08); *H04L 41/0677* (2013.01); *H04L 47/34* (2013.01);
(Continued)

(58) Field of Classification Search
CPC ............. H04W 36/0058; H04W 76/27; H04W 36/305; H04W 36/08; H04L 41/0677; H04L 47/34; H04L 67/2842; Y02D 30/70
(Continued)

(56) References Cited

U.S. PATENT DOCUMENTS

2009/0040982 A1    2/2009    Ho et al.
2015/0208311 A1*   7/2015    Lee .................... H04W 36/30
                                                            455/436
2018/0007730 A1    1/2018    Fujishiro

FOREIGN PATENT DOCUMENTS

CN    101779493 A    7/2010
CN    101883406 A    11/2010
(Continued)

OTHER PUBLICATIONS

XP051299009 3GPP TS 36.300 V14.3.0 (Jun. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2(Release 14), 335 pages.
(Continued)

*Primary Examiner* — Marcos Batista
(74) *Attorney, Agent, or Firm* — Stein IP, LLC

(57) ABSTRACT

The method is applied to a communications system including a first network device, a second network device, and a terminal device. The terminal device is communicatively connected to the first network device and the second network device respectively. The method includes: sending, by a network device, a first message to the terminal device, where the first message is used to determine that the terminal device stops communication with the first network device, or the first message is used to determine that the terminal device releases a protocol stack and a data radio bearer that are corresponding to the first network device; and the
(Continued)

network device is the first network device or the second network device. Therefore, power consumption of the terminal device or the first network device and waste of air interface resources can be reduced, and flexibility can effectively be improved in a communication process.

11 Claims, 6 Drawing Sheets

(51) Int. Cl.
*H04W 36/30* (2009.01)
*H04L 12/24* (2006.01)
*H04L 12/801* (2013.01)
*H04L 29/08* (2006.01)

(52) U.S. Cl.
CPC ....... *H04L 67/2842* (2013.01); *H04W 36/305* (2018.08); *H04W 76/27* (2018.02)

(58) Field of Classification Search
USPC .................................. 455/436, 437; 370/338
See application file for complete search history.

(56) References Cited

FOREIGN PATENT DOCUMENTS

| | | |
|---|---|---|
| CN | 105101253 A | 11/2015 |
| EP | 2249601 B1 | 12/2016 |
| WO | 2015019172 A2 | 2/2015 |
| WO | 2016013814 A1 | 1/2016 |
| WO | 2016125887 A1 | 8/2016 |

OTHER PUBLICATIONS

XP051299019 3GPP TS 36.321 V14.3.0 (Jun. 2017), 3rd Generation Partnership Project; Technical Specification Group Radio Access Network; Evolved Universal Terrestrial Radio Access (E-UTRA); Medium Access Control (MAC) protocol specification(Release 14), 107 pages.

* cited by examiner

WIRELESS COMMUNICATION METHOD AND APPARATUS

CROSS-REFERENCE TO RELATED APPLICATIONS

This application is a national stage of International Application No. PCT/CN2017/097276, filed on Aug. 11, 2017, which is hereby incorporated by reference in its entirety.

This application relates to the communications field, and more specifically, to a wireless communication method and apparatus in the communications field.

BACKGROUND

Technical Field

In 5th generation (5G) mobile communications, a handover (Handover, HO) latency is required to be 0 ms. In other words, transmission time is not interrupted when a terminal device is handed over from a source network device (or a source base station) to a target network device (or a target base station). To achieve the 0 ms latency during handover, two stack protocols are established for the terminal device, so that the terminal device can communicatively connect separately to the source network device and the target network device at the same time. To be specific, the terminal device maintains a communication connection to the source network device, and performs random access to the target network source network at the same time, so that the terminal device can separately receive data sent by the source network device and the target network device.

To implement data transmission with the 0 ms latency during HO, an HO process in a new radio technology (NR) may be implemented by using the following solution: for data that is transmitted by a core network device to the source network device over a same S1 bearer or a same S1-U bearer, the source network device caches a part of the data and forwards remaining data to the target network device. A path between the source network device and the terminal device transmits the data cached by the source network device, and a path between the target network device and the terminal device transmits the data forwarded by the source network device to the target network device. In this way, data is always exchanged between the terminal device and the source network device or the target network device during the HO. In addition, when the source network device no longer sends data to the terminal device, or the source network device no longer receives data from the terminal device, the source network device releases a protocol stack and a data radio bearer that are corresponding to the terminal device, and stops communication with the terminal device. Likewise, when the terminal device no longer receives data sent by the source network device, or no longer sends data to the source network device, the terminal device also releases a protocol stack and a data radio bearer that are corresponding to the source network device, and stops communication with the source network device.

However, during the HO, if the source network device has released the protocol stack and the data radio bearer that are corresponding to the terminal device (in this case, the terminal device cannot communicate with the source network device either), the terminal device does not learn that the source network device has released the protocol stack and the data radio bearer that are corresponding to the terminal device, and still listens to a channel to receive data sent by the source network device. This reduces flexibility in a communication process.

Therefore, a technology needs to be provided for the terminal device or the source network device to determine that the terminal device cannot communicate with the source network device. This can improve flexibility in a communication process.

SUMMARY

Aspects of this application provides a wireless communication method to improve flexibility in a communication process.

A first aspect provides a wireless communication method, applied to a communications system including a first network device, a second network device, and a terminal device, where the terminal device is communicatively connected to the first network device and the second network device respectively, and the method includes:

sending, by a network device, a first message to the terminal device, where the first message is used to determine that the terminal device stops communication with the first network device, or the first message is used to determine that the terminal device releases a protocol stack and a data radio bearer that are corresponding to the first network device; and the network device is the first network device or the second network device.

Therefore, according to the wireless communication method provided in this embodiment of this application, when determining that the first network device and the terminal device no longer need to communicate, the first network device or the second network device sends the first message to the terminal device, so that the terminal device stops, based on the first message, communication with the first network device or releases the protocol stack and the data radio bearer corresponding to the first network device. This can reduce power consumption of the terminal device for continuously listening to a channel, reduce waste of air interface resources, and effectively improve flexibility in a communication process.

In addition, if the first network device sends the first message, the first network device learns that the first network device no longer needs to communicate with the terminal device any longer. Therefore, the first network device also stops communication with the terminal device or releases a protocol stack and a data radio bearer that are corresponding to the terminal device. This can reduce power consumption of the first network device and waste of air interface resources, and effectively improve flexibility in a communication process.

In some implementations of the first aspect, the first message carries at least one of the following:

first radio resource control (RRC) information;

a first media access control (MAC) control element (CE);

a first data packet, where a sequence number or a count value of the first data packet is the same as or adjacent to a sequence number or a count value of a second data packet, and the second data packet is sent by the second network device; or a first packet data convergence protocol (PDCP) control protocol data unit (PDU), where the first PDCP control PDU includes a first number, and the first number is used to indicate a last data packet sent by the first network device.

In some implementations of the first aspect, the network device is the first network device, and before the sending, by the network device, a first message to the terminal device, the method further includes:

receiving, by the first network device, a first measurement report sent by the terminal device or the second network device, where the first measurement report is used to indicate that quality of a channel between the terminal device and the first network device is lower than or equal to a threshold; or sending, by the first network device, the last data packet cached by the first network device to the terminal device; or stopping, by the first network device, sending a data packet to the terminal device; or receiving, by the first network device, a second message sent by the second network device, where the second message is used to instruct the first network device to stop communication with the terminal device, or the second message is used to instruct the first network device to release a protocol stack and a data radio bearer that are corresponding to the terminal device.

In some implementations of the first aspect, the network device is the first network device, and before the receiving, by the first network device, a second message sent by the second network device, the method further includes:

sending, by the first network device, a first data message to the second network device, where the first data message is used to instruct the first network device to stop sending a data packet to the terminal device; or sending, by the first network device, a second measurement report to the second network device, where the second measurement report is used to indicate that quality of a channel between the terminal device and the first network device is lower than or equal to a threshold.

In some implementations of the first aspect, the network device is the second network device, and the first message carries at least one of the following:

second radio resource control RRC information;

a second media access control MAC control element CE;

a third data packet, where a sequence number or a count value of the third data packet is the same as or adjacent to a sequence number or a count value of a fourth data packet, and the fourth data packet is sent by the first network device; and a second packet data convergence protocol PDCP control protocol data unit PDU, where the second PDCP control PDU includes a second number, and the second number is used to indicate a first data packet sent by the second network device.

In some implementations of the first aspect, the network device is the second network device, and before the sending, by the network device, a first message to the terminal device, the method further includes:

receiving, by the second network device, a third measurement report sent by the terminal device or the first network device, where the third measurement report is used to indicate that quality of a channel between the terminal device and the first network device is lower than or equal to a threshold; or receiving, by the second network device, a third message sent by the first network device, where the third message is used to instruct the first network device to stop communication with the terminal device, or the third message is used to instruct the first network device to release a protocol stack and a data radio bearer that are corresponding to the terminal device; or receiving, by the second network device, a second data message sent by the first network device, where the second data message is used to instruct the first network device to stop sending a data packet to the terminal device; or receiving, by the second network device, a first radio link failure message sent by the terminal device, where the first radio link failure message is used to indicate that a radio link failure occurs between the terminal device and the first network device.

In some implementations of the first aspect, the network device is the second network device, and the method further includes:

sending, by the second network device, a fourth message to the first network device, where the fourth message is used to instruct the first network device to stop communication with the terminal device, or the fourth message is used to instruct the first network device to release a protocol stack and a data radio bearer that are corresponding to the terminal device.

Therefore, when the terminal device may not need to communicate with the first network device, to enable the first network device to learn a subsequent action of the first network device (or to learn a communication status between the terminal device and the first network device), the second network device sends the fourth message to the first network device. The first network device may determine that the first network device does not need to communicate with the terminal device, and stop communication with the terminal device or release the protocol stack and the data radio bearer that are corresponding to the terminal device. This can reduce power consumption of the first network device and waste of air interface resources, and effectively improve flexibility in a communication process.

In some implementations of the first aspect, before the sending, by the second network device, a fourth message to the first network device, the method further includes:

receiving, by the second network device, a fourth measurement report sent by the terminal device or the first network device, where the fourth measurement report is used to indicate that quality of a channel between the terminal device and the first network device is lower than or equal to a threshold; or receiving, by the second network device, a second radio link failure message sent by the terminal device, where the second radio link failure message is used to indicate that a radio link failure occurs between the terminal device and the first network device; or receiving, by the second network device, a third data message sent by the first network device, where the third data message is used to instruct the first network device to stop sending a data packet to the terminal device.

A second aspect provides a wireless communication method, applied to a communications system including a first network device, a second network device, and a terminal device, where the terminal device is communicatively connected to the first network device and the second network device respectively, and the method includes:

receiving, by the terminal device, a first message sent by a network device, where the network device is the first network or the second network device; and after receiving the first message, stopping, by the terminal device, communication with the first network device, or releasing a protocol stack and a data radio bearer that are corresponding to the first network device.

Therefore, according to the wireless communication method provided in this embodiment of this application, when determining that the first network device and the terminal device no longer need to communicate, the first network device or the second network device sends the first message to the terminal device, so that the terminal device stops, based on the first message, communication with the first network device or releases the protocol stack and the data radio bearer corresponding to the first network device. This can reduce power consumption of the terminal device for continuously listening to a channel, reduce waste of air interface resources, and effectively improve flexibility in a communication process.

In some implementations of the second aspect, the network device is the first network device, the first information carries at least one of the following:

first radio resource control (RRC) information;
a first media access control (MAC) control element (CE);
a first data packet, where a sequence number or a count value of the first data packet is the same as or adjacent to a sequence number or a count value of a second data packet, and the second data packet is sent by the second network device; or
a first packet data convergence protocol (PDCP) control protocol data unit (PDU), where the first PDCP control PDU includes a first number, and the first number is used to indicate a last data packet sent by the first network device; or alternatively,
the network device is the second network device, and the first information carries at least one of the following:
second radio resource control RRC information;
a second media access control MAC control element CE;
a third data packet, where a sequence number or a count value of the third data packet is the same as or adjacent to a sequence number or a count value of a fourth data packet, and the fourth data packet is sent by the first network device; or
a second packet data convergence protocol PDCP control protocol data unit PDU, where the second PDCP control PDU includes a second number, and the second number is used to indicate a first data packet sent by the second network device.

In some implementations of the second aspect, the network device is the first network device, the first message carries the first PDCP control PDU, and after receiving the first message, the stopping, by the terminal device, communication with the first network device, or releasing a protocol stack and a data radio bearer that are corresponding to the first network device includes:

after receiving the data packet indicated by the first number and all data packets before the data packet indicated by the first number, stopping, by the terminal device, communication with the first network device, or releasing the protocol stack and the data radio bearer that are corresponding to the first network device; or the first message carries the second PDCP control PDU, and after receiving the first message, the stopping, by the terminal device, communication with the first network device, or releasing a protocol stack and a data radio bearer that are corresponding to the first network device includes:

after receiving the data packet indicated by the second number and all data packets before the data packet indicated by the second number, stopping, by the terminal device, communication with the first network device, or releasing the protocol stack and the data radio bearer that are corresponding to the first network device.

In some implementations of the second aspect, the method further includes:

sending, by the terminal device, a first measurement report to the first network device, where the first measurement report is used to indicate that quality of a channel between the terminal device and the first network device is lower than or equal to a threshold; or sending, by the terminal device, a third measurement report to the second network device, where the third measurement report is used to indicate that quality of a channel between the terminal device and the first network device is lower than or equal to a threshold; or sending, by the terminal device, a fourth measurement report to the second network device, where the fourth measurement report is used to indicate that quality of a channel between the terminal device and the first network device is lower than or equal to a threshold; or sending, by the terminal device, a first radio link failure message to the second network device, where the first radio link failure message is used to indicate that a radio link failure occurs between the terminal device and the first network device; or sending, by the terminal device, a second radio link failure message to the second network device, where the first radio link failure message is used to indicate that a radio link failure occurs between the terminal device and the first network device.

A third aspect provides a wireless communication method, applied to a communications system including a first network device, a second network device, and a terminal device, where the terminal device is communicatively connected to the first network device and the second network device respectively, and the method includes:

receiving, by a network device, a fifth message sent by the terminal device, where the fifth message is used to instruct the first network device to stop communication with the terminal device, or the fifth message is used to instruct the first network device to release a protocol stack and a data radio bearer that are corresponding to the terminal device; and the network device is the first network device or the second network device.

Therefore, according to the wireless communication method provided in this application, when determining that the terminal device needs to stop communication with the first network device or may release a protocol stack and a data radio bearer that are corresponding to the first network device, the terminal device cannot communicate with the first network device. To enable the first network device to also learn an action of the terminal device (or learn a communication status between the terminal device and the first network device), the terminal device sends the fifth message to the network device (the first network device or the second network device). The first network device determines that the first network device does not need to communicate with the terminal device, and stops communication with the terminal device or releases the protocol stack and the data radio bearer that are corresponding to the terminal device. This can reduce power consumption of the first network device and waste of air interface resources, and effectively improve flexibility in a communication process.

In some implementations of the third aspect, the fifth message carries at least one of the following:

third radio resource control RRC information; and
a fifth measurement report, where the fifth measurement report is used to indicate that quality of a channel between the terminal device and the first network device is lower than or equal to a threshold.

In some implementations of the third aspect, the network device is the first network device, and after the receiving, by a network device, a fifth message sent by the terminal device, the method further includes:

stopping, by the first network device, communication between the terminal device, or releasing, by the first network device, the protocol stack and the data radio bearer that are corresponding to the terminal device.

In some implementations of the third aspect, the network device is the second network device, and after the receiving, by a network device, a fifth message sent by the terminal device, the method further includes:

sending, by the second network device, a sixth message to the first network device based on the fifth message, where the sixth message is used to instruct the first network device to stop communication with the terminal device; or the sixth message is used to instruct the first network device to release the protocol stack and the data radio bearer that are corresponding to the terminal device.

Therefore, the second network device generates the sixth message based on the fifth message sent by the terminal device, and sends the sixth message to the first network device. In other words, the second network device forwards the received fifth message to the first network device in a form of the sixth message. If the terminal device cannot normally communicate with the first network device, this effectively avoids a case in which the first network device cannot learn whether to stop communication with the terminal device, or whether to release the protocol stack and the data radio bearer corresponding to the terminal device. This further improves flexibility in a communication process.

A fourth aspect provides a wireless communication method, applied to a communications system including a first network device, a second network device, and a terminal device, where the terminal device is communicatively connected to the first network device and the second network device respectively, and the method includes:

sending, by the terminal device, a fifth message to a network device, where the fifth message is used to instruct the first network device to stop communication with the terminal device, or the fifth message is used to instruct the first network device to release a protocol stack and a data radio bearer that are corresponding to the terminal device; and the network device is the first network device or the second network device; and after sending the fifth message, stopping, by the terminal device, communication with the first network device, or releasing a protocol stack and a data radio bearer that are corresponding to the first network device.

Therefore, according to a wireless communication method provided in this application, when determining that the terminal device needs to stop communication with the first network device or may release a protocol stack and a data radio bearer that are corresponding to the first network device, the terminal device cannot communicate with the first network device. To enable the first network device to also learn an action of the terminal device (or learn a communication status between the terminal device and the first network device), the terminal device sends the fifth message to the network device (the first network device or the second network device). The first network device determines that the first network device does not need to communicate with the terminal device, and stops communication with the terminal device or releases the protocol stack and the data radio bearer that are corresponding to the terminal device. This can reduce power consumption of the first network device and waste of air interface resources, and effectively improve flexibility in a communication process. In addition, after sending the fifth message, the terminal device also stops communication with the first network device or releases the protocol stack and the data radio bearer that are corresponding to the first network device. This also reduces power consumption of the terminal device for continuously listening to a channel, reduces waste of air interface resources, and effectively improves flexibility in a communication process.

In some implementations of the fourth aspect, the sending, by the terminal device, a fifth message to a network device includes:

sending, by the terminal device, the fifth information based on at least one of the following conditions, where the at least one condition includes:

quality of a channel between the terminal device and the first network device is lower than or equal to a threshold;

a radio link failure occurs between the terminal device and the first access network device; and a timer of the terminal device times out.

In some implementations of the fourth aspect, the fifth message is a fifth measurement report, and the fifth measurement report is used to indicate that the quality of the channel between the terminal device and the first network device is lower than or equal to a threshold.

A fifth aspect provides a wireless communication method, applied to a communications system including a first network device, a second network device, and a terminal device, where the terminal device is communicatively connected to the first network device and the second network device respectively, and the method includes:

sending, by the second network device, a second message to the first network device, where the second message is used to instruct the first network device to stop communication with the terminal device, or the second message is used to instruct the first network device to release a protocol stack and a data radio bearer that are corresponding to the terminal device.

In some implementations of the fifth aspect, before the sending, by the second network device, a second message to the first network device, the method further includes:

receiving, by the second network device, a second measurement report sent by the terminal device or the first network device, where the second measurement report is used to indicate that quality of a channel between the terminal device and the first network device is lower than a threshold; or receiving, by the second network device, a first data message sent by the first network device, where the first data message is used to instruct the first network device to stop sending a data packet to the terminal device; and the sending, by the second network device, a second message to the first network device includes:

sending, by the second network device, the second message based on the second measurement report or the first data message.

A sixth aspect provides a wireless communications apparatus, and the apparatus may be configured to perform an operation of the network device according to the first aspect or any possible implementation of the first aspect. Specifically, the apparatus may include a module or unit configured to perform the operation of the network device according to the first aspect or any possible implementation of the first aspect.

A seventh aspect provides a wireless communications apparatus, and the apparatus may be configured to perform an operation of the terminal device according to the second aspect or any possible implementation of the first aspect. Specifically, the apparatus may include a module or unit configured to perform the operation of the terminal device according to the second aspect or any possible implementation of the second aspect.

An eighth aspect provides a wireless communications apparatus, and the apparatus may be configured to perform an operation of the network device according to the third aspect or any possible implementation of the third aspect. Specifically, the apparatus may include a module or unit configured to perform the operation of the network device according to the third aspect or any possible implementation of the third aspect.

A ninth aspect provides a wireless communications apparatus, and the apparatus may be configured to perform an operation of the terminal device according to the fourth aspect or any possible implementation of the fourth aspect. Specifically, the apparatus may include a module or unit configured to perform the operation of the terminal device according to the fourth aspect or any possible implementation of the fourth aspect.

A tenth aspect provides a wireless communications apparatus, and the apparatus may be configured to perform an operation of the second network device according to the fifth aspect or any possible implementation of the fifth aspect. Specifically, the apparatus may include a module or unit configured to perform the operation of the second network device according to the fifth aspect or any possible implementation of the fifth aspect.

An eleventh aspect provides a network device, and the network device includes: a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the network device is enabled to execute the method according to the first aspect or any possible implementation of the first aspect, or the network device is enabled to implement the apparatus according to the sixth aspect.

A twelfth aspect provides a terminal device, and the terminal device includes: a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the terminal device is enabled to perform the method according to the second aspect or any possible implementation of the second aspect, or the terminal device is enabled to implement the apparatus according to the seventh aspect.

A thirteenth aspect provides a network device, and the network device includes: a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the network device is enabled to perform the method according to the third aspect or any possible implementation of the third aspect, or the network device is enabled to implement the apparatus according to the eighth aspect.

A fourteenth aspect provides a terminal device, and the terminal device includes: a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the terminal device is enabled to perform the method according to the fourth aspect or any possible implementation of the fourth aspect, or the terminal device is enabled to implement the apparatus according to the ninth aspect.

A fifteenth aspect provides a network device, and the network device includes: a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the network device is enabled to perform the method according to the fifth aspect or any possible implementation of the fifth aspect, or the network device is enabled to implement the apparatus according to the tenth aspect.

A sixteenth aspect provides a chip system, including a memory and a processor. The memory is configured to store a computer program, and the processor is configured to invoke the computer program from the memory and run the computer program, so that a communications device on which the chip system is installed performs the method according to any one of the first aspect to the fifth aspect, and the implementations of the aspects.

A seventeenth aspect provides a computer program product, and the computer program product includes computer program code. When the computer program code is run by a communications unit and a processing unit, or a transceiver and a processor of a communications device (such as a network device or a terminal device), the communications device is enabled to perform the method according to any one of the first aspect to the fifth aspect, and the implementations of the aspects.

An eighteenth aspect provides a computer-readable storage medium, and the computer-readable storage medium stores a program. The program enables a communications device (such as a network device or a terminal device) to perform the method according to any one of the first aspect to the fifth aspect, and the implementations of the aspects.

In some of the foregoing implementations, the first network device is a source network device, and after the sending, by the first network device, a first message to the terminal device, the method further includes:

stopping, by the source network device, transmission to the first network device, or releasing, by the source network device, a protocol stack and a data radio bearer that are corresponding to the source network device.

BRIEF DESCRIPTION OF DRAWINGS

FIG. 1 is a schematic diagram of a structure of a wireless communications system to which a wireless communication method and apparatus according to an embodiment of this application are applicable to;

DETAILED DESCRIPTION OF EMBODIMENTS

The following describes technical solutions in this application with reference to the accompanying drawings.

The technical solutions of embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5G system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, an in-vehicle device, a wearable device, or a network device in a future 5G network, or a network device in a future evolved PLMN network. This is not limited in the embodiments of this application.

Figure 1:
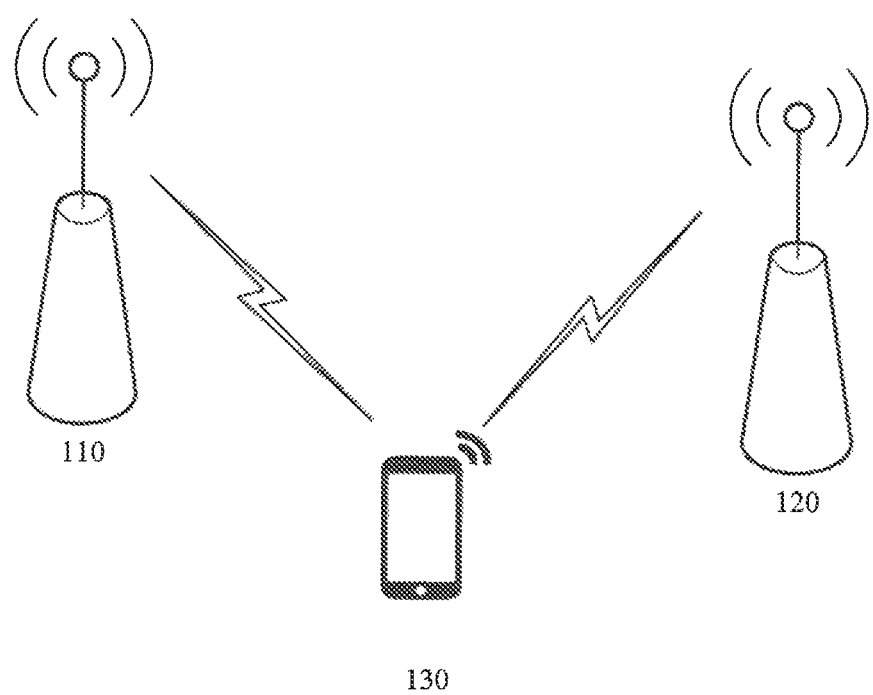

FIG. 1 is a schematic diagram of a structure of a wireless communications system to which a wireless communication method and apparatus according to an embodiment of this application are applicable to. As shown in FIG. 1, the wireless communications system includes a first network device (namely, a source network device or a source base station) 110, a second network device (namely, a target network device or a target base station) 120, and a terminal device 130. The terminal device 130 is communicatively connected to the first network device 110 and the second network device 120 respectively.

Specifically, to implement communication connections between the terminal device 130 and the first network device 110 and between the terminal device 130 and the second network device 120, the terminal device 130 establishes a stack protocol and a data radio bearer with the first network device 110 and the second network device 120 respectively. In this way, the terminal device 130 establishes a path to the first network device 110 and the second network device 120 respectively, so that the terminal device 130 can receive data sent by the first network device 110 and the second network device 120 respectively.

This embodiment of this application may be applied to an HO scenario. The first network device 110 is a network device in a cell in which the terminal device 130 is currently located, and the second network device 120 is a network device in a cell to which the terminal device 130 is handed over. In a process in which the terminal device 130 needs to be handed over from the first network device 110 to the second network device 120, a communication connection between the terminal device 130 and the first network device 110 does not need to be disconnected and is retained, and a communication connection between the terminal device 130 and the first network device 110 is established. In this way, the terminal device 130 is communicatively connected to the first network device 110 and the second network device 120 respectively.

During data forwarding in an HO process, data is transmitted by a core network to the first network device 110 on a same data radio bearer, the first network device 110 caches a part of the data and forwards remaining data to the second network device 120. The path between the first network device 110 and the terminal device 130 transmits the data cached by the first network device 110, and the path between the second network device 120 and the terminal device 130 transmits the data forwarded by the first network device 110 to the second network device 120. Therefore, data is always exchanged between the terminal device 130 and the second network device 120 in the HO process. In addition, when the second network device 120 no longer sends the data to the terminal device 130, or the second network device 120 no longer receives the data from the terminal device 130, the second network device 120 releases the protocol stack and the data radio bearer that are corresponding to the terminal device 130. Likewise, when the terminal device 130 no longer receives the data sent by the second network device 120, or no longer sends the data to the second network device 120, the terminal device 130 also releases the protocol stack and the data radio bearer that are corresponding to the first network device 110.

As an example rather than a limitation, this embodiment of this application may be not only applied to the HO scenario, but also applied to another scenario as long as the terminal device is communicatively connected to at least two network devices. For example, this embodiments of this application may alternatively be applied to a dual connectivity scenario (a terminal device is communicatively connected to two network devices respectively, and the like. This embodiment of the present invention is not limited thereto.

An embodiment of this application provides a wireless communication method. The method is applied to a communications system that includes a network device #A (namely, an example of the first network device), a network device #B (namely, an example of the second network device), and a terminal device. The terminal device is communicatively connected to the network device #A and the network device #B respectively. The method includes:

sending, by a network device, a message #1 (namely, an example of a first message) to the terminal device, where the message #1 is used to determine that the terminal device stops communication with the network device #A, or the message #1 is used to determine that the terminal device releases a protocol stack and a data radio bearer that are corresponding to the network device #A; and the network device is the network device #A or the network device #B.

Specifically, when the network device #A determines that it needs to stop communication with the terminal device or may release a protocol stack and a data radio bearer that are corresponding to the terminal device, the network device #A sends the message #1 to the terminal device. After receiving the message #1, the terminal device stops, based on the message #1, communication with the network device #A (for example, no longer listens to a channel), or releases the protocol stack and the data radio bearer that are corresponding to the network device #A.

Alternatively, the network device #A learns that it needs to stop communication with the terminal device, or may release the protocol stack and the data radio bearer that are corresponding to the terminal device, and therefore the network device #A cannot communicate with the terminal device. To enable the terminal device to also learn an action of the network device #A (or learn a communication status between the network device #A and the terminal device), the network device #A may send the message #1 to the terminal device. The terminal device determines that the terminal device does not need to communicate with the network device #A, and stops communication with the network device #A or releases the protocol stack and the data radio bearer that are corresponding to the network device #A. This can reduce power consumption of the terminal device for continuously listening to a channel, reduce waste of air interface resources, and effectively improve flexibility in a communication process.

When the network device #B determines that the terminal device may stop communication with the network device #A or may release the protocol stack and the data radio bearer that are corresponding to the network device #A, the network device #B sends the message #1 to the terminal device. After receiving the message #1, the terminal device stops, based on the message #1, communication with the network device #A (for example, no longer listens to a channel), or releases the protocol stack and the data radio bearer that are corresponding to the network device #A.

In other words, when the network device #B determines that the terminal device may not need to communicate with the network device #A, to enable the terminal device to learn a subsequent action of the terminal device (or learn a communication status between the terminal device and the network device #A), the network device #B may send the message #1 to the terminal device. The terminal device determines that the terminal device does not need to communicate with the network device #A, and stops communication with the network device #A or releases the protocol stack and the data radio bearer that are corresponding to the network device #A. This can reduce power consumption of the terminal device for continuously listening to a channel, reduce waste of air interface resources, and effectively improve flexibility in a communication process.

Therefore, according to the wireless communication method provided in this embodiment of this application, when determining that the first network device and the terminal device no longer need to communicate, the first network device or the second network device sends the first message to the terminal device, so that the terminal device stops, based on the first message, communication with the first network device or releases the protocol stack and the data radio bearer corresponding to the first network device. This can reduce power consumption of the terminal device for continuously listening to a channel, reduce waste of air interface resources, and effectively improve flexibility in a communication process.

In addition, if the first network device sends the first message, the first network device learns that the first network device does not need to communicate with the terminal device any longer. Therefore, the first network device also stops communication with the terminal device or releases a protocol stack and a data radio bearer that are corresponding to the terminal device. This can reduce power consumption of the first network device and waste of air interface resources, and effectively improve flexibility in a communication process.

As described above, if transmission between the terminal device and the network device needs to be handed over from the network device #A to the network device #B, when the terminal device establishes a connection to the network device #B, the terminal device and the network device #B need to establish a new data radio bearer (denoted as a data radio bearer #B for ease of distinguishing and understanding) to bear data borne by a same S1 bearer or S1-U bearer that is shared by the data radio bearer #A and is used by the core network device, and establish a corresponding packet data convergence protocol (Packet Data Convergence Protocol, PDCP) and a corresponding radio link control (Radio Link Control, RLC) protocol stack. An ID of the data radio bearer #B between the terminal device and the network device #B may be configured in the following manners:

Manner 1

The ID of the data radio bearer #B is the same as an ID #1 of the data radio bearer (denoted as a data radio bearer #A for ease of distinguishing and understanding) between the terminal device and the network device #A. In other words, the ID of the data radio bearer #B is ID #1.

Manner 2

The ID of the data radio bearer #B is different from an ID #1 of the data radio bearer #A. The ID of the data radio bearer #B is denoted as ID #2. There is a correspondence between the data radio bearer #B and the data radio bearer #A. The correspondence may be configured by using the network device, or may be notified to the terminal device in a manner specified by signaling or a protocol.

It should be understood that both data borne by the data radio bearer #A and data borne by the data radio bearer #B are data borne on a same S1 bearer or S1-U bearer used by the core network device.

In this embodiment of this application, before sending the message #1 to the terminal device, the network device #A or the network device #B may determine the message #1 based on different conditions. The following describes in detail the wireless communication method in this embodiment of this application with reference to FIG. 2 to FIG. 3 by separately using the network device #A and the network device #B as an entity for sending the message #1.

First, the following describes in detail the wireless communication method in this embodiment of this application by using the network device #A as an entity for sending the message #1.

Before sending the message #1, the network device #A determines, based on different conditions, whether to continue communication with the terminal device. If the network device #A determines that it does not need to continue communication with the terminal device, the network device #A sends the information #1.

Figure 2:
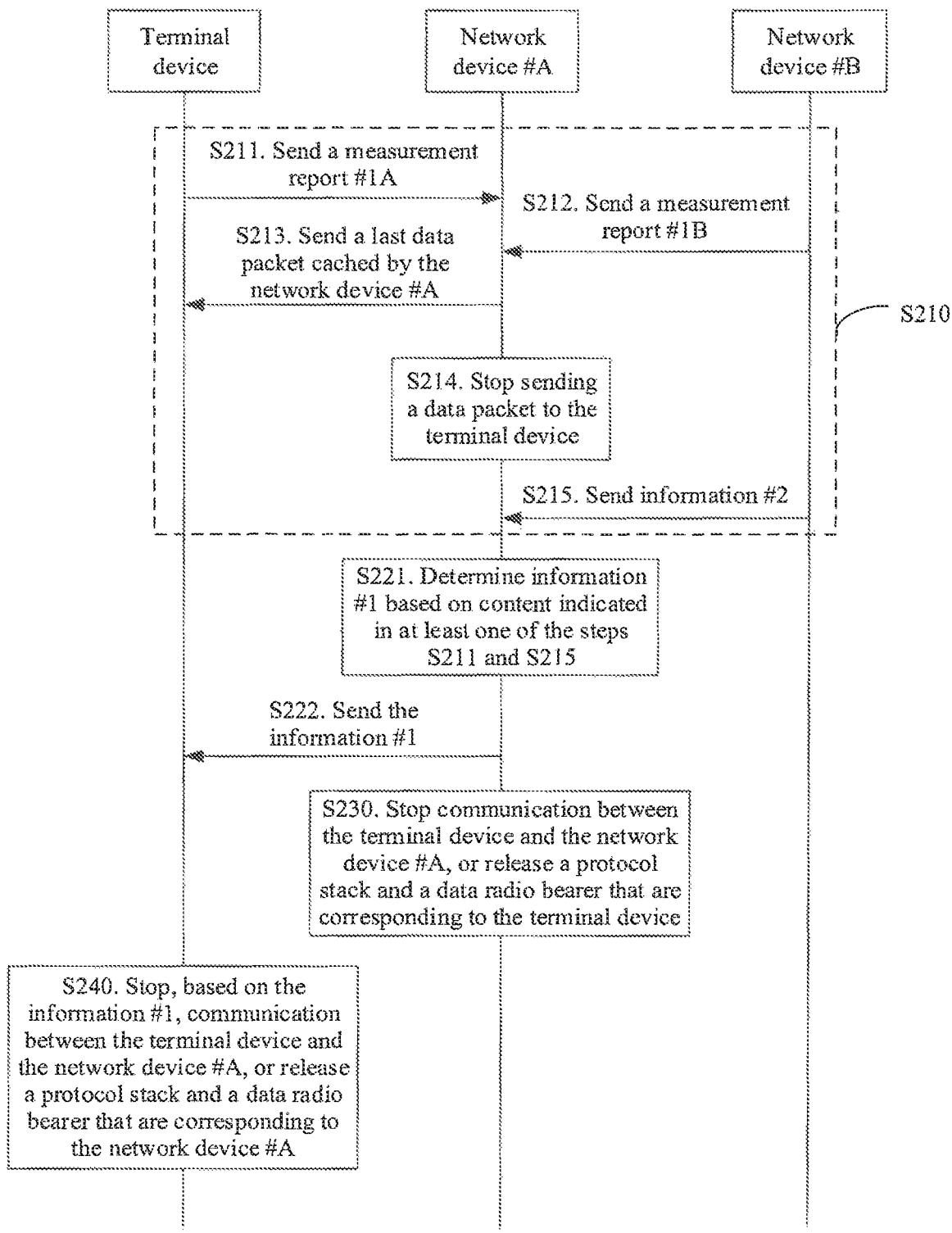
FIG. 2 is a schematic diagram showing interaction of a terminal device, a network device #A, and a network device #B in a wireless communication method according to an embodiment of this application.

FIG. 2 is a schematic diagram showing interaction of the terminal device, the network device #A, and the network device #B in a wireless communication method in this embodiment of this application.

Specifically, as shown in FIG. 2, in step S210, the network device #A performs at least one step, where content indicated by the at least one step is used as a condition for determining to send the message #1, and content indicated by the at least one step includes:

Step S211: The network device #A receives a measurement report #1A (namely, an example of a first measurement report) sent by the terminal device.

Step S212: The network device #A receives a measurement report #1B (namely, another example of the first measurement report) sent by the network device #B.

Step S213: The network device #A sends, to the terminal device, a last data packet cached by the network device #A.

Step S214: The network device #A stops sending a data packet to the terminal device.

Step S215: The network device #A receives a message #2 (namely, an example of a second message) sent by the network device #B.

It should be understood that the measurement report #1A and the measurement report #1B have a same function, and are both used to indicate that quality of a channel between the terminal device and the network device #A is lower than a threshold. Different letters are used herein only to distinguish a transmit end device that sends the measurement report. This is not construed as a limitation on this embodiment of this application. In addition, a same case in the following is also used to distinguish the transmit end device that sends the measurement report.

It should be further understood that sequence numbers of the steps S211 to S215 are not construed as to imply that the steps are order dependent. Herein, the sequence numbers are merely used to describe steps that may be performed by the network device #A. During implementation, corresponding steps may be performed based on an actual situation.

Specifically, contents indicated in the steps S211 and S212 are that the quality of the channel between the terminal device and the network device #A is lower than or equal to a threshold. The threshold may be a preset quality threshold of the channel between the terminal device and the network device #A, or may be a sum of a preset value and quality of a channel between the terminal device and the network device #B. The preset value may be configured by the network device and notified to the terminal device in a manner specified by signaling or a protocol. Content indicated in the step S213 is that the network device #A has sent the data packet cached by the network device #A. Content indicated in the step S214 is that the network device #A no longer sends a data packet to the terminal device (which may be that the network device #A does not send a data packet in a case of the step S213, or may be that the network device #A does not send a data packet in another case). Content indicated in the step S215 is that the information #2 instructs the network device #A to stop communication with the terminal device or release the protocol stack and the data radio bearer that are corresponding to the network device #A.

Therefore, in step S221, the network device #A may determine, based on the content indicated in the at least one of the foregoing steps, that the network device #A may not need to continue communication with the terminal device, and determine the message #1 to instruct the terminal device to stop communication with the network device #A, or release the corresponding protocol stack and data wireless communication. Then, the network device #A sends the message #1 in step S222.

It should be noted that the steps S221 and S222 may be combined into one step (to be specific, send the message #1) during implementation. This is merely a logical step described herein, and should not be construed as a limitation on this embodiment of this application.

In step S230, after sending the message #1, the network device #B stops communication with the terminal device, or releases the protocol stack and the data radio bearer that are corresponding to the terminal device. From any perspective, the connection between the terminal device and the network device #A is disconnected, and therefore the communication fails. The network device #B stopping communication with the terminal device may specifically not be receiving or sending a data packet. In addition, releasing the protocol stack and the data radio bearer that are corresponding to the terminal device may be understood as stopping communication with the terminal device.

In step S240, after receiving the message #1, the terminal device stops communication with the network device #A, or releases the protocol stack and the data radio bearer that are corresponding to the network device #A, in other words, disconnects a connection to the network device #A.

In this embodiment of this application, at least one content carried in the message #1 may be used to instruct the terminal device to stop communication with the network device #A, or to release the protocol stack and the data radio bearer that are corresponding to the network device #A. The at least one content is:

first radio resource control (RRC) information;

a first media access control (MAC) control element (CE);

a first data packet, where a sequence number or a count value of the first data packet is the same as or adjacent to a sequence number or a count value of a second data packet, and the second data packet is sent by the second network device; and a first packet data convergence protocol (PDCP) control protocol data unit (PDU), where the first PDCP control PDU includes a first number, and the first number is used to indicate a last data packet sent by the first network device.

Specifically, the first RRC information and the first MAC CE may be used as explicit information. For example, the first RRC information may directly instruct the terminal device to stop communication with the network device #A, or release the protocol stack and the radio data bearer that are corresponding to the network device #A. The first MAC CE may instruct, by using a logical channel identity (Logical Channel Identify, LCID) field in a header, the terminal device to stop communication with the network device #A, or release the protocol stack and the radio data bearer that are corresponding to the network device #A.

The first MAC CE, the first data packet, and the first PDCP control PDU may be used as implicit information for indication. The first MAC CE may instruct, by using an LCID field in a header, the network device #A to send the last data packet. The terminal device may determine, based on the first MAC CE, the first data packet, or the first PDCP control PDU, that the terminal device no longer needs to continue communication with the network device #A. The first number of the first PDCP control PDU is a sequence number (Sequence number, SN) or a count value related to the data packet.

In step S240, when the message #1 carries the first RRC information or the first MAC CE, the terminal device may directly determine that the terminal device no longer needs to continue communication with the network device #A, and stop communication with the network device #A, or release the protocol stack and the data radio bearer that are corresponding to the network device #A.

In the step S240, when the message #1 carries the first MAC CE, after detecting the first MAC CE that indicates that the network device #A has stopped sending a data packet to the terminal device, the terminal device determines that the terminal device no longer needs to continue communication with the network device #A, and stops communication with the network device #A, or releases the protocol stack and the data radio bearer that correspond to the network device #A.

In the step S240, when the message #1 carries the first data packet, after detecting that an SN or a count value of the first data packet is the same as or adjacent to an SN or a count value of a first data packet received from the network device #B, and this indicates that the network device #A has sent the data packet cached by the network device #A, the terminal device determines that the terminal device no longer needs to continue communication with the network device #A, and stops communication with the network device #A, or release the protocol stack and the data radio bearer that are corresponding to the network device #A.

In the step S240, when the message #1 carries the first PDCP control PDU, after receiving, based on the first number, the data packet indicated by the first number and all data packets before the data packet indicated by the first number, the terminal device stops communication with the network device #A, or releases the protocol stack and the data radio bearer that are corresponding to the network device #A.

When the network device #A determines the message #1 based on the contents indicated in the foregoing different steps, contents carried in the message #1 may be the same or different.

For example, when the network device #A sends the message #1 based on the measurement report #1A indicated in the step S211, the measurement report #1B indicated in the step S212, and the message #2 indicated in the step S215, the content carried in the message #1 may be the first RRC information and/or the first MAC CE.

For another example, when the network device #A sends the message #1 based on the contents indicated in the steps S213 and S214, the content carried in the message #1 may be the first data packet and/or the first PDCP control PDU, or may be all the contents that can be carried in the message #1.

It should be understood that determining, by the network device #A based on the content indicated in the foregoing different steps, the content of the message #1 is merely an example, and should not be construed as a limitation on this embodiment of this application.

In this embodiment of this application, the network device may comprehensively determine, based on the received measurement report, a quantity of data packets cached by the network device #A, the message #2, and the like, whether to send the message #1. It should be noted that the measurement report described herein does not indicate that the channel quality indicated by the measurement report #1A and the measurement report #1B is lower than or equal to a threshold, but only indicates that the quality of the channel between the terminal device and the network device #A may be higher than a threshold, or may be lower than or equal to a threshold.

For example, in an optional embodiment, the network device #A determines, based on the measurement report and the quantity of data cached by the network device #A, whether to send the message #1.

Specifically, the network device #A first determines, based on the received measurement report, whether the quality of the channel between the terminal device and the network device is lower than a threshold. If the channel quality is lower than or equal to the threshold, the network device #A sends the message #1. If the channel quality is higher than the threshold, the network device #A temporarily does not send the message #1. Then, the network device #A determines, based on whether the network device #A has cached the data packet, whether to send the message #1. If the network device #A has cached the data packet, the network device #A does not send the message #1, but continues to maintain a communication connection to the terminal device. If the network device #A has sent all data packets, the network device #A sends the message #1.

For another example, in another optional embodiment, the network device #A determines, based on the message #2, the measurement report, and a size of the data cached by the network device #A, whether to send the message #1.

Specifically, the network device #A first determines, based on whether the message #2 is received, whether to send the message #1. If the network device #A receives the message #2, the network device #A sends the message #1. If the network device #A does not receive the message #2, the network device #A temporarily does not send the message #1. Then, the network device #A determines, based on the received measurement report, whether the quality of the channel between the terminal device and the network device is lower than a threshold. If the channel quality is lower than or equal to the threshold, the network device #A sends the message #1. If the channel quality is higher than the threshold, the network device #A temporarily does not send the message #1. Finally, the network device #A determines, based on whether the network device #A has cached a data packet, whether to send the message #1. If the network device #A has cached the data packet, the network device #A does not send the message #1, but continues to maintain a communication connection to the terminal device. If the network device #A has sent all data packets, the network device #A sends the message #1.

It should be understood that the foregoing example is merely an example. The network device #A may determine, based on at least any two types of the foregoing information, whether to send the message #1. Which messages are determined by the network device #A to send the message #1 are determined based on an actual situation. This is not limited in this embodiment of this application.

It should be noted that, in step S215, the network device #A receives the message #2 sent by the network device #B, where the message #2 may be determined by the network device #B based on different messages sent by the network device #A.

Optionally, before the receiving, by the first network device, a second message sent by the second network device, the method further includes:

sending, by the first network device, a first data message to the second network device, where the first data message is used to instruct the first network device to stop sending a data packet to the terminal device; or sending, by the first network device, a second measurement report to the second network device, where the second measurement report is used to indicate that quality of a channel between the terminal device and the first network device is lower than or equal to a threshold.

Correspondingly, after the network device #B receives a data message #1 (namely, an example of the first data message) and/or the measurement report #2 (namely, an example of the second measurement report), the network device #B generates the message #2 based on at least one of the data message #1 or the measurement report #2, and sends the message #2 to the network device #A. Further, the network device #A may send the message #1 to the terminal device based on the message #2.

It should be understood that the measurement report #2 may be a measurement report received by the network device #A from the terminal device, and forwarded to the network device #B.

It should be understood that, the measurement report #2, the measurement report #1A, and the measurement report #1B have a same function, and are all used to indicate that the quality of the channel between the terminal device and the network device #A is lower than a threshold. Different Arabic numerals are used herein to distinguish different cases of sending or receiving a measurement report. This is not construed as a limitation on the embodiment of this application.

In addition, a plurality of measurement reports mentioned in the following are distinguished by using Arabic numerals to distinguish different cases of sending or receiving a measurement report. Likewise, a plurality of data messages mentioned in the following are distinguished by using Arabic numerals to distinguish different cases of sending or receiving data information. Likewise, a plurality of radio link failure messages mentioned in the following are distinguished by using Arabic numerals to distinguish different cases of sending or receiving a radio link failure message. The explanation of similar cases in the following is the same as that described herein, and is not described again in the following.

Figure 3:
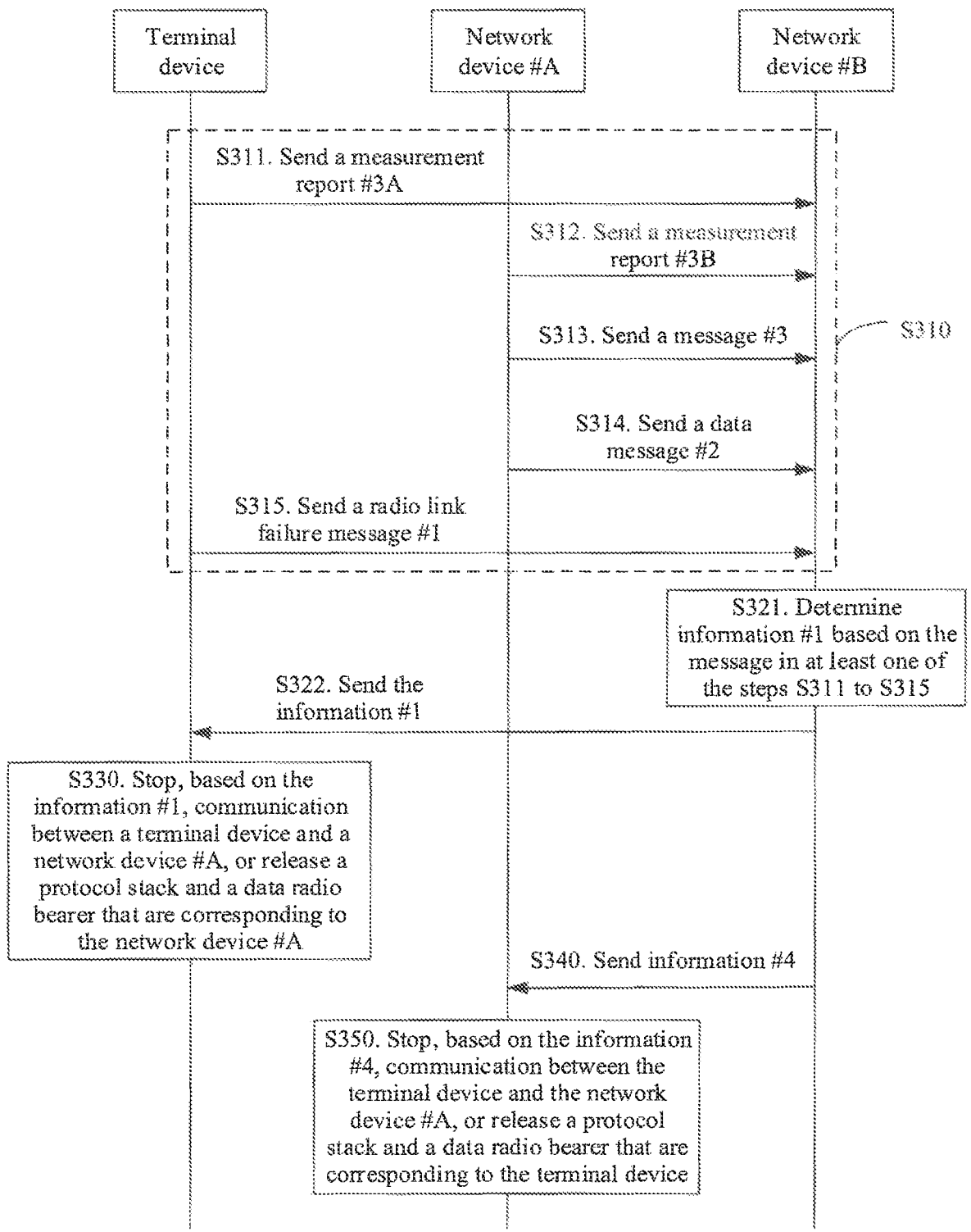
FIG. 3 is a schematic diagram showing interaction of a terminal device, a network device #A, and a network device #B in a wireless communication method according to another embodiment of this application.

With reference to FIG. 2, the wireless communication method in this embodiment of this application is described in detail above by using the network device #A as an entity for sending the message #1. With reference to FIG. 3, the following describes in detail the wireless communication method in this embodiment of this application by using the network device #B as an entity of sending the message #1.

FIG. 3 is a schematic diagram showing interaction of the terminal device, the network device #A, and the network device #B in a wireless communication method according to another embodiment of this application.

Specifically, as shown in FIG. 3, in step S310, the network device #B performs at least one step (or receives various messages sent by the terminal device or the network device #A), and content indicated by the at least one step is used as a condition for determining to send the message #1. The content indicated by the at least one step includes:

Step S311: The network device #B receives a measurement report #3A (namely, an example of the third measurement report) sent by the terminal device, where the measurement report #3A is used to indicate that the quality of the channel between the terminal device and the network device #A is lower than or equal to a threshold.

Step S312: The network device #B receives a measurement report #3B (namely, another example of the third measurement report) sent by the network device #A, where the measurement report #3B is used to indicate that the quality of the channel between the terminal device and the network device #A is lower than or equal to a threshold.

Step S313: The network device #B receives a message #3 (namely, an example of the third message) sent by the network device #A, where the message #3 is used to instruct the network device #A to stop communication between the terminal device and the network device #A, or release the protocol stack and the data radio bearer that are corresponding to the terminal device.

Step S314: The network device #B receives a data message #2 (namely, an example of the second data message) sent by the network device #A, where the data message #2 is used to instruct the network device #A to stop sending a data packet to the terminal device.

Step S315: The network device #B receives a radio link failure message #1 (namely, an example of the first radio link failure message) sent by the terminal device, where the radio link failure message #1 is used to indicate that a radio link failure occurs between the terminal device and the network device #A.

It should be further understood that sequence numbers of the steps S311 to S315 are not construed as to imply that the steps are order dependent. Herein, the sequence numbers are merely used to describe steps that may be performed by the network device #B. During implementation, corresponding steps may be performed based on an actual situation.

In the step S313, the message #3 may be sent by the network device #3 to the network device #B after the network device #A determines, based on the content indicated in at least one of the steps S211 to 215, that the network device #A needs to stop communication with the terminal device. Then, the network device #B generates the message #1 based on the message #3, and sends the message #1 to the terminal device. When the network device #A cannot communicate with the terminal device (for example, when the channel quality is lower than or equal to a threshold, the terminal device is unable to communicate with the network device #A due to poor channel quality), the network device #A cannot directly send a message instructing to stop communication with the terminal, the network device #A send the message #1 by using the network device #B to improve information transmission efficiency.

In the step S314, the data message #2 may be either of the cases described above. If the network device #A sends the message #1 to the terminal device, the network device #A sends, to the network device #B, the data message #1 that is used to generate the message #2. If the network device #A does not send the message #1, the network device #B may use the data message #2 to determine content of the message #1, and finally send the message #1.

In step S321, the network device #B may determine, based on the content indicated in the at least one of the foregoing steps, that the terminal device may not need to continue communication with the network device #A, determine the message #1, and further send the message #1 in step S322.

It should be noted that, the steps S321 and S322 may be combined into one step (to be specific, send the message #1) during implementation. This is merely a logical step described herein, and should not be construed as a limitation on this embodiment of this application.

In step S330, after receiving the message #1, the terminal device stops communication with the network device #A, or releases a protocol stack and a data radio bearer that are corresponding to the network device #A, in other words, disconnects a connection to the network device #A.

In this embodiment of this application, the at least one content carried in the message #1 may be used to instruct the terminal device to stop communication with the network device #A, or to release the protocol stack and the data radio bearer that are corresponding to the network device #A. The at least one content is:

second radio resource control (RRC) information;

a second media access control (MAC) control element (CE);

a third data packet, where a sequence number or a count value of the third data packet is the same as or adjacent to a sequence number or a count value of a fourth data packet, and the fourth data packet is sent by the first network device; and a second packet data convergence protocol (PDCP) control protocol data unit (PDU), where the second PDCP control PDU includes a second number, and the second number is used to indicate the first data packet sent by the second network device.

Specifically, the second RRC information and the second MAC CE may be used as explicit information. For example, the second RRC information may directly instruct the terminal device to stop communication with the network device #A, or release the protocol stack and the radio data bearer that are corresponding to the network device #A. The second MAC CE may instruct, by using a logical channel identity (LCD) field in a header, the terminal device to stop communication with the network device #A, or release the protocol stack and the radio data bearer that are corresponding to the network device #A. The second MAC CE, the third data packet, and the second PDCP control PDU may be used as implicit information for indication. The second MAC CE may instruct, by using an LCID field in a header, the network device #A to send the last data packet. The terminal device may determine, based on the third data packet or the second PDCP control PDU, that the terminal device no longer needs to continue communication with the network device #A. The second number of the second PDCP control PDU is an SN or a count value related to the data packet.

In the step S330, when the message #1 carries the second RRC information or the second MAC CE, the terminal device may directly determine that the terminal device no longer needs to continue communication with the network device #A, stop communication with the network device #A, or release the protocol stack and the data radio bearer that are corresponding to the network device #A.

In the step S330, when the message #1 carries the second MAC CE, after detecting the second MAC CE that indicates that the network device #A has stopped sending a data packet to the terminal device, the terminal device determines that the terminal device no longer needs to continue communication with the network device #A, stops communication with the network device #A, or releases the protocol stack and the data radio bearer that correspond to the network device #A.

In the step S330, when the message #1 carries the third data packet, after detecting that an SN or a count value of the third data packet is the same as or adjacent to an SN or a count value of a last data packet received from the network device #A, and this indicates that the network device #A has sent the data packet cached by the network device #A, the terminal device determines that the terminal device no longer needs to continue communication with the network device #A, and stops communication with the network device #A, or release the protocol stack and the data radio bearer that are corresponding to the network device #A.

In the step S330, when the message #1 carries the second PDCP control PDU, after receiving, based on the second number, the data packet indicated by the second number and all data packets before the data packet indicated by the second number, the terminal device stops communication with the network device #A, or releases the protocol stack and the data radio bearer that are corresponding to the network device #A.

When the network device #B determines the message #1 based on the foregoing different contents, the contents carried in the message #1 may be the same or different.

For example, when the network device #B sends the message #1 based on the measurement report #3A indicated in the step S311, the measurement report #3B indicated in the step S312, the message #3 indicated in the step S313, and the radio link failure message #1 indicated in the step 315, the content carried in the message #1 may be the second RRC information and/or the second MAC CE.

For another example, when the network device #B sends the message #1 based on the data message #2 indicated in the step S314, the content carried in the message #1 may be the third data packet and/or the second PDCP control PDU, or may be all the contents that can be carried in the message #1.

It should be understood that determining, by the network device #B based on the content indicated in the foregoing different steps, the content of the message #1 is merely an example, and should not be construed as a limitation on this embodiment of this application.

Optionally, the method further includes:

sending, by the network device #B, a message #4 (namely, an example of the fourth message) to the network device #A, where the message #4 is used to instruct the network device #A to stop communication with the terminal device, or release the protocol stack and the data radio bearer that are corresponding to the terminal device.

In other words, when determining that the terminal device no longer needs to communicate with the network device #A, the network device #B sends the message #1 to the terminal device, and the terminal device stops communication with the network device #A, or releases the protocol stack and the data radio bearer that are corresponding to the network device #A. The network device #B also sends the message #4 to the network device #A, and the network device #A stops communication with the terminal device, or releases the protocol stack and the data radio bearer that are corresponding to the terminal device.

Therefore, when the terminal device may not need to communicate with the first network device, to enable the first network device to learn a subsequent action of the first network device (or to learn a communication status between the terminal device and the first network device), the second network device sends the fourth message to the first network device. The first network device may determine that the first network device does not need to communicate with the terminal device, and stop communication with the terminal device or release the protocol stack and the data radio bearer that are corresponding to the terminal device. This can reduce power consumption of the first network device and waste of air interface resources, and effectively improve flexibility in a communication process.

Likewise, a condition for determining that the network device #B sends the message #4 may be content indicated in at least one of the following steps:

optionally, before the sending, by the network device #B, a fourth message to the first network device, the method further includes:

receiving, by the network device #B, a measurement report #4A (namely, an example of the fourth measurement report) sent by the terminal device, where the measurement report #4A is used to indicate that quality of a channel between the terminal device and the network device #A is lower than or equal to a threshold; or receiving, by the network device #B, a measurement report #4B (namely, another example of the fourth measurement report) sent by the network device #A, where the measurement report #4B is used to indicate that quality of a channel between the terminal device and the network device #A is lower than or equal to a threshold; or receiving, by the network device #B, a radio link failure message #2 (namely, an example of the second radio link failure message) sent by the terminal device, where the radio link failure message #2 is used to indicate that a radio link failure occurs between the terminal device and the network device #A; or receiving, by the network device #B, a data message #3 (namely, an example of the third data message) sent by the network device #A, where the data message #3 is used to instruct the network device #A to stop sending a data packet to the terminal device.

In other words, the network device #B may send the message #4 based on at least one of the received measurement report #4A, the measurement report #4B, the radio link failure message #2, or the data message #3.

It should be noted that, if the network device #A sends the message #1, the message #4 may be the message #2 that is used by the network device #A to determine that the network device #A may stop communication with the terminal device, or release the protocol stack and the data radio bearer that are corresponding to the terminal device. Then, the network device #A determines the message #1 based on the message #2, and sends the message 1. If the network device #A does not send the message #1, the message #4 may be that the network device #B directly determines, based on the received various messages, whether to send the message #4.

The network device #B may determine, based on a same message, whether the terminal device needs to continue communication with the network device #A, and send the message #1 to the terminal device and the message #4 to the network device #A if determining that the terminal device no longer needs to continue communication with the network device #A.

In this case, if the network device #A does not send the message #1, the measurement report #3A may be the measurement report #4A or the measurement report #4B, the radio link failure message #2 may be the radio link failure message #1, and the data message #3 may be the data message #2.

In this embodiment of this application, the network device #B may comprehensively determine, based on the received measurement report, the data message sent by the network device #A, the radio link failure message, the message #3, and the like, whether to send the message #1 and/or the message #4.

It should be noted that the measurement report described herein does not indicate that the channel quality indicated by the measurement report #3A, the measurement report #3B, or the like is lower than or equal to a threshold, but only indicates that the quality of the channel between the terminal device and the network device #A may be higher than a threshold, or may be lower than or equal to a threshold. In addition, the measurement report, the data message, the radio link failure message, and the like described herein do not indicate messages in any case (for example, the foregoing messages with a same function are distinguished by using different Arabic numerals). Functions of the various messages are used to describe how to determine the message #1 and/or the message #4 based on at least one message in this embodiment of this application. For brevity, the following description uses only an example in which the network device #B sends the message #1. A case in which the network device #B sends the message #4 is similar to a case in which the network device #B sends the message #1.

For example, in an optional embodiment, the network device #B determines, based on the measurement report and the data message, whether to send the message #1.

Specifically, the network device #B first determines, based on the received measurement report, whether the quality of the channel between the terminal device and the network device #A is lower than a threshold. If the channel quality is lower than or equal to the threshold, the network device #B sends the message #1. If the channel quality is higher than the threshold, the network device #B temporarily does not send the message #1. Then, the network device #B determines, based on the data message, whether to send the message #1. If the network device #B receives the data message, the network device #B sends the message #1. If the network device #B does not receive the data message, the network device #B does not send the message #1, and the network device #A continues to maintain a communication connection to the terminal device.

For another example, in another optional embodiment, the network device #B determines, based on the measurement report, the data message, and the radio link failure message, whether to send the message #1.

Specifically, the network device #B first determines, based on whether the radio link failure message is received, whether to send the message #1. If the network device #B receives the radio link failure message, the network device #B sends the message #1. If the network device #B does not receive the radio link failure message, the network device #B temporarily does not send the message #1. Then, the network device #B determines, based on the received measurement report, whether the quality of the channel between the terminal device and the network device #A is lower than a threshold. If the channel quality is lower than or equal to the threshold, the network device #B sends the message #1. If the channel quality is higher than the threshold, the network device #B temporarily does not send the message #1. Finally, the network device #A determines, based on the data message, whether to send the message #1. If the network device #B receives the data message, the network device #A sends the message #1. If the network device #B does not receive the data message, the network device #A does not send the message #1, but continues to maintain a communication connection to the terminal device.

It should be understood that the foregoing example is merely an example. The network device #B may determine, based on at least any two types of the foregoing messages, whether to send the message #1. Which messages are determined by the network device #B to send the message #1 and/or the message #4 are determined based on an actual situation. This is not limited in this embodiment of this application.

Figure 4:
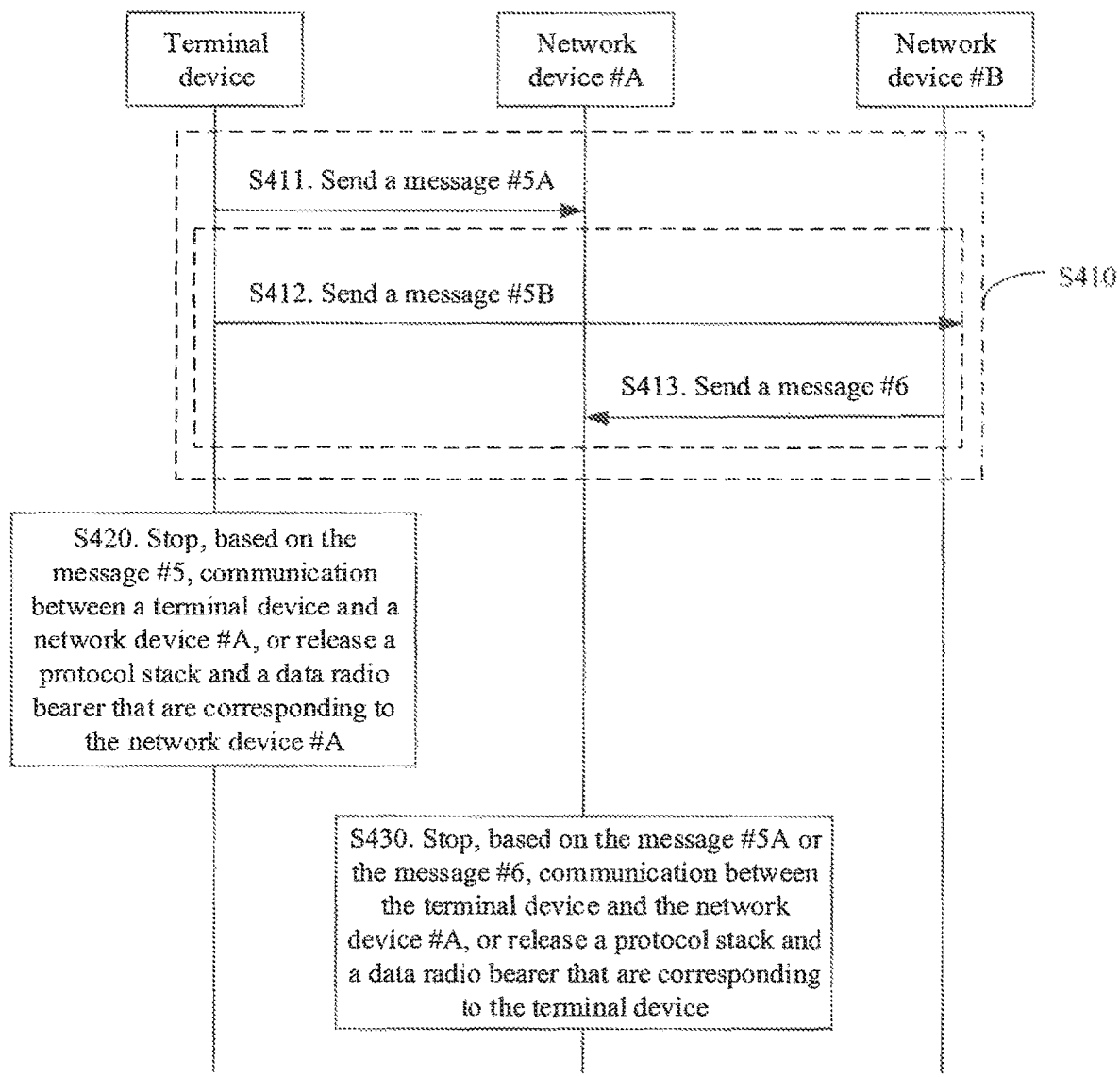
FIG. 4 is a schematic diagram showing interaction of a terminal device, a network device #A, and a network device #B in a wireless communication method according to still another embodiment of this application.

With reference to FIG. 2 and FIG. 3, the wireless communication method in this embodiment of this application is described in detail above by using the network device #A and the network device #B as entities for sending the message #1. With reference to FIG. 4, the following describes in detail the wireless communications channel method in this embodiment of this application by using the terminal device as an entity for sending a message instructing the network device #A to stop a communication connection to the terminal device or release a protocol stack and a data radio bearer that are corresponding to the terminal device.

FIG. 4 is a schematic diagram showing interaction of the terminal device, the network device #A, and the network device #B in a wireless communication method according to still another embodiment of this application.

As shown in FIG. 4, the method includes the following steps.

Step S410: The terminal device sends a fifth message to a network device, where the fifth message is used to instruct the network device #A to stop communication with the terminal device, or release the protocol stack and the data radio bearer that are corresponding to the terminal device; and the network device is the network device #A or the network device #B.

Specifically, when the terminal device determines that it no longer needs to continue communication with the network device #A, the terminal device sends a message to the network device #A or the network device #B. The network device #A may finally determine, based on the received message, that the network device #A no longer continues communication with the terminal device. The network device #A can also stop communication with the terminal device, or release the protocol stack and the data radio bearer that are corresponding to the terminal device.

Optionally, the terminal device may send the fifth information based on at least one of the following conditions. The at least one condition includes:

quality of a channel between the terminal device and a first network device is lower than or equal to a threshold;

a radio link failure occurs between the terminal device and the first network device; and a timer of the terminal device times out.

Timeout of the timer of the terminal device indicates that a system configures a timer for the terminal device, and the terminal device sends the fifth message when duration of the timer is greater than or equal to preset duration.

Therefore, according to the wireless communication method provided in this application, when determining that the terminal device needs to stop communication with the first network device or may release a protocol stack and a data radio bearer that are corresponding to the first network device, the terminal device cannot communicate with the first network device. To enable the first network device to also learn an action of the terminal device (or learn a communication status between the terminal device and the first network device), the terminal device sends the fifth message to the network device (the first network device or a second network device). The first network device determines that the first network device does not need to communicate with the terminal device, and stops communication with the terminal device or releases the protocol stack and the data radio bearer that are corresponding to the terminal device. This can reduce power consumption of the first network device and waste of air interface resources, and effectively improve flexibility in a communication process. In addition, after sending the fifth message, the terminal device also stops communication with the first network device or releases the protocol stack and the data radio bearer that are corresponding to the first network device. This also reduces power consumption of the terminal device for continuously listening to a channel, reduces waste of air interface resources, and effectively improves flexibility in a communication process.

To enable the network device #A to determine whether the network device #A needs to continue communication with the terminal device, the terminal device sends the fifth message in two manners:

Manner A:

In step S411, the terminal device sends a message #5A (namely, an example of the fifth message) to the network device #A. In other words, the terminal device directly sends the message #5A to the network device #A. The manner A is applicable to a case in which the terminal device can normally communicate with the network device #A.

Manner B:

In step S412, the terminal device sends a message #5B (namely, another example of the fifth message) to the network device #B. After the network device #B receives the message #5B, the method further includes:

The network device #B sends a message #6 (namely, an example of the sixth message) to the network device #A based on the message #5B. The message #6 is used to instruct the network device #A to stop communication with the terminal device, release the protocol stack and data wireless communication corresponding to the terminal device.

In other words, from a logic perspective, in the manner B, the network device #B forwards the received message #5B to the network device #A. From an implementation perspective, the network device #B sends the message #5B to the network device #A in a form of the message #6.

The manner B is applicable to a case in which the terminal device cannot normally communicate with the network device #A.

Therefore, the second network device generates the sixth message based on the fifth message sent by the terminal device, and sends the sixth message to the first network device. In other words, the second network device forwards the received fifth message to the first network device in a form of the sixth message. If the terminal device cannot normally communicate with the first network device, this effectively avoids a case in which the first network device cannot learn whether to stop communication with the terminal device, or whether to release the protocol stack and the data radio bearer corresponding to the terminal device. This further improves flexibility in a communication process.

It should be further understood that sequence numbers of the steps S411 to S413 are not construed as to imply that the steps are order dependent. Herein, the sequence numbers are merely used to describe steps that may be performed by the terminal device. During implementation, corresponding steps may be performed based on an actual situation.

In step S420, after sending the message #5 (namely, the message #5A or the message #5B), the terminal device stops communication with the network device #A, or releases a protocol stack and a data radio bearer that are corresponding to the network device #A.

In step S430, after receiving the message #5A sent by the terminal device or the message #6 sent by the network device #B, the network device #A stops communication with the terminal device, or releases the protocol stack and the data radio bearer that are corresponding to the terminal device.

Optionally, the fifth message carries at least one of the following:

third radio resource control (RRC) information; and a fifth measurement report, where the fifth measurement report is used to indicate that quality of a channel between the terminal device and the first network device is lower than or equal to a threshold.

The measurement report #5 (namely, an example of the fifth measurement report) may be used as a trigger condition (or an implicit indication of the fifth message). When receiving the measurement report #5, the network device #A determines that the network device #A no longer needs to communicate with the terminal device, in other words, stops communication with the terminal device or releases the protocol stack and the data radio bearer that are corresponding to the terminal device.

The wireless communication method in the embodiments of this application is described above in detail with reference to FIG. 1 to FIG. 4. An apparatus for uplink data feedback in the embodiments of this application is described below with reference to FIG. 5 and FIG. 8. Technical features described in the method embodiments are also applicable to the following apparatus embodiments.

Figure 5:
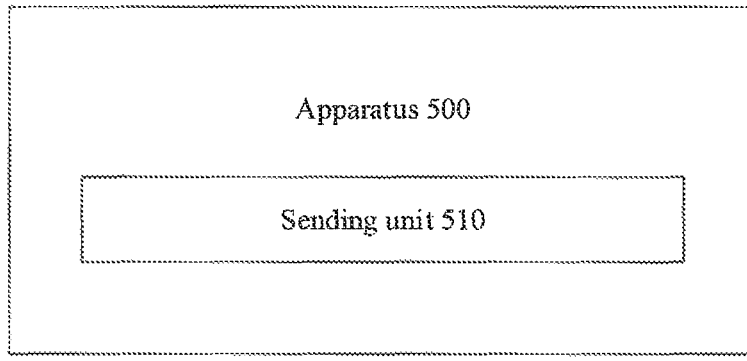
FIG. 5 is a schematic block diagram of a communications apparatus 500 according to an embodiment of this application.

FIG. 5 is a schematic block diagram of a communications apparatus 500 according to an embodiment of this application. As shown in FIG. 5, the apparatus 500 includes:

a sending unit 510, configured to send a first message to the terminal device, where the first message is used to determine that a terminal device stops communication with a first network device, or the first message is used to determine that the terminal device releases a protocol stack and a data radio bearer that are corresponding to the first network device; and the apparatus is the first network device or a second network device.

Therefore, according to the wireless communications apparatus provided in this embodiment of this application, when determining that the first network device and the terminal device no longer need to communicate, the apparatus sends the first message to the terminal device, so that the terminal device stops, based on the first message, communication with the first network device or releases the protocol stack and the data radio bearer corresponding to the first network device. This can reduce power consumption of the terminal device for continuously listening to a channel, reduce waste of air interface resources, and effectively improve flexibility in a communication process.

In addition, if the first network device sends the first message, the first network device learns that the first network device no longer needs to communicate with the terminal device any longer. Therefore, the first network device also stops communication with the terminal device or releases a protocol stack and a data radio bearer that are corresponding to the terminal device. This can reduce power consumption of the first network device and waste of air interface resources, and effectively improve flexibility in a communication process.

Optionally, the apparatus is the first network device, and the first message carries at least one of the following:

first radio resource control (RRC) information;

a first media access control (MAC) control element (CE);

a first data packet, where a sequence number of the first data packet is the same as or adjacent to a sequence number of a second data packet, and the second data packet is sent by the second network device; or a first packet data convergence protocol (PDCP) control protocol data unit (PDU), where the first PDCP control PDU includes a first number, and the first number is used to indicate a last data packet sent by the first network device.

Optionally, the apparatus is the first network device, and the apparatus further includes:

a receiving unit 520, configured to receive a first measurement report sent by the terminal device or the second network device, where the first measurement report is used to indicate that quality of a channel between the terminal device and the first network device is lower than or equal to a threshold.

Alternatively, the sending unit 510 is further configured to send the last data packet cached by the first network device to the terminal device.

The apparatus further includes:

a processing unit 530, configured to stop sending a data packet to the terminal device.

Alternatively, the receiving unit 520 is further configured to receive a second message sent by the second network device, where the second message is used to instruct the first network device to stop communication with the terminal device, or the second message is used to instruct the first network device to release the protocol stack and the data radio bearer that are corresponding to the terminal device.

Optionally, the sending unit 510 is further configured to send a first data message to the second network device, where the first data message is used to instruct the first network device to stop sending a data packet to the terminal device.

Alternatively, the sending unit 510 is further configured to send a second measurement report to the second network device, where the second measurement report is used to indicate that the quality of the channel between the terminal device and the first network device is lower than or equal to a threshold.

Optionally, the apparatus is the second network device, and the first message carries at least one of the following:

second radio resource control (RRC) information;

a second media access control (MAC) control element (CE);

a third data packet, where a sequence number or a count value of the third data packet is the same as or adjacent to a sequence number or a count value of a fourth data packet, and the fourth data packet is sent by the first network device; and a second packet data convergence protocol (PDCP) control protocol data unit (PDU), where the second PDCP control PDU includes a second number, and the second number is used to indicate the first data packet sent by the second network device.

Optionally, the apparatus is the second network device, and the apparatus further includes:

a receiving unit 520, configured to receive a third measurement report sent by the terminal device or the first network device, where the third measurement report is used to indicate that the quality of the channel between the terminal device and the first network device is lower than or equal to a threshold.

Alternatively, the receiving unit 520 is further configured to receive a third message sent by the first network device, where the third message is used to instruct the first network device to stop communication with the terminal device, or the third message is used to instruct the first network device to release the protocol stack and the data radio bearer that are corresponding to the terminal device.

Alternatively, the receiving unit 520 is further configured to receive a second data message sent by the first network device, where the second data message is used to instruct the first network device to stop sending a data packet to the terminal device.

Alternatively, the receiving unit 520 is further configured to receive a first radio link failure message sent by the terminal device, where the first radio link failure message is used to indicate that a radio link failure occurs between the terminal device and the first network device.

Optionally, the apparatus is the second network device, and the sending unit 510 is further configured to:

send a fourth message to the first network device, where the fourth message is used to instruct the first network device to stop communication with the terminal device, or the fourth message is used to instruct the first network device to release the protocol stack and the data radio bearer that are corresponding to the terminal device.

Therefore, when the terminal device may not need to communicate with the first network device, to enable the first network device to learn a subsequent action of the first network device (or to learn a communication status between the terminal device and the first network device), the second network device sends the fourth message to the first network device. The first network device may determine that the first network device does not need to communicate with the terminal device, and stop communication with the terminal device or release the protocol stack and the data radio bearer that are corresponding to the terminal device. This can reduce power consumption of the first network device and waste of air interface resources, and effectively improve flexibility in a communication process.

Optionally, the receiving unit 520 is further configured to receive a fourth measurement report sent by the terminal device or the first network device, where the fourth measurement report is used to indicate that the quality of the channel between the terminal device and the first network device is lower than or equal to a threshold.

Alternatively, the receiving unit 520 is further configured to receive a second radio link failure message sent by the terminal device, where the second radio link failure message is used to indicate that a radio link failure occurs between the terminal device and the first network device.

Alternatively, the receiving unit 520 is further configured to receive a third data message sent by the first network device, where the third data message is used to instruct the first network device to stop sending a data packet to the terminal device.

The wireless communications apparatus 500 may correspond to (for example, may be configured to or the apparatus may function as) the first network device described in the method 200 or the second network device described in the method 300. Modules or units in the wireless communications apparatus 500 are configured to perform the actions or processing processes performed by the first network device in the method 200 or the second network device in the method 300. To avoid repetition, details are not described herein again.

In this embodiment of this application, the apparatus 500 may be the network device. In this case, the apparatus 500 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 510 in the apparatus 500 shown in FIG. 5 may be corresponding to the transmitter.

Figure 6:
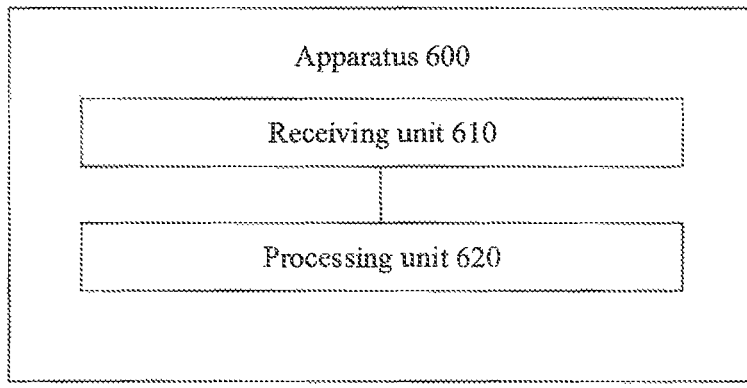
FIG. 6 is a schematic block diagram of a communications apparatus 600 according to an embodiment of this application.

FIG. 6 is a schematic block diagram of a communications apparatus 600 according to an embodiment of this application. As shown in FIG. 6, the apparatus 600 includes:

a receiving unit 610, configured to receive a first message sent by a network device, where the network device is a first network or a second network device; and a processing unit 620, configured to: after receiving the first message, stop communication with the first network device, or release a protocol stack and a data radio bearer that are corresponding to the first network device.

Therefore, according to the wireless communication apparatus provided in this embodiment of this application, when determining that the first network device and the apparatus no longer need to communicate, the first network device or the second network device sends the first message to the apparatus, so that the apparatus stops, based on the first message, communication with the first network device or releases the protocol stack and the data radio bearer corresponding to the first network device. This can reduce power consumption of the apparatus for continuously listening to a channel, reduce waste of air interface resources, and effectively improve flexibility in a communication process.

Optionally, the network device is the first network device, and the first information carries at least one of the following:

first radio resource control (RRC) information;

a first media access control (MAC) control element (CE);

a first data packet, where a sequence number or a count value of the first data packet is the same as or adjacent to a sequence number or a count value of a second data packet, and the second data packet is sent by the second network device; and a first packet data convergence protocol (PDCP) control protocol data unit (PDU), where the first PDCP control PDU includes a first number, and the first number is used to indicate a last data packet sent by the first network device.

Alternatively, the network device is the second network device, and the first information carries at least one of the following:

second radio resource control RRC information;

a second media access control MAC control element CE;

a third data packet, where a sequence number or a count value of the third data packet is the same as or adjacent to a sequence number or a count value of a fourth data packet, and the fourth data packet is sent by the first network device; or a second packet data convergence protocol PDCP control protocol data unit PDU, where the second PDCP control PDU includes a second number, and the second number is used to indicate the first data packet sent by the second network device.

Optionally, the network device is the first network device, the first message carries the first PDCP control PDU, and the processing unit 620 is specifically configured to:

after receiving the data packet indicated by the first number and all data packets before the data packet indicated by the first number, stop communication between the apparatus and the first network device, or release the protocol stack and the data radio bearer that are corresponding to the first network device.

Alternatively, the first message carries the second PDCP control PDU, and the processing unit 620 is specifically configured to:

after receiving the data packet indicated by the second number and all data packets before the data packet indicated by the second number, stop communication between the apparatus and the first network device, or release the protocol stack and the data radio bearer that are corresponding to the first network device.

Optionally, the apparatus may further include a sending unit 630, configured to:

send a first measurement report to the first network device, where the first measurement report is used to indicate that quality of a channel between the apparatus and the first network device is lower than or equal to a threshold; or send a third measurement report to the second network device, where the third measurement report is used to indicate that quality of a channel between the apparatus and the first network device is lower than or equal to a threshold; or send a fourth measurement report to the second network device, where the fourth measurement report is used to indicate that quality of a channel between the apparatus and the first network device is lower than or equal to a threshold; or send a first radio link failure message to the second network device, where the first radio link failure message is used to indicate that a radio link failure occurs between the apparatus and the first network device; or send a second radio link failure message to the second network device, where the first radio link failure message is used to indicate that a radio link failure occurs between the apparatus and the first network device.

The wireless communications apparatus 600 may correspond to (for example, may be configured to or the apparatus may function as) the terminal device described in the method 200 or the method 300. Modules or units in the wireless communications apparatus 600 are configured to perform the actions or processing processes performed by the terminal device in the method 200 or the method 300. To avoid repetition, details are not described herein again.

In this embodiment of this application, the apparatus 600 may be the terminal device. In this case, the apparatus 600 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 610 in the apparatus 600 shown in FIG. 6 may be corresponding to the receiver, and the processing unit 620 in the apparatus 600 shown in FIG. 6 may be corresponding to the processor.

Figure 7:
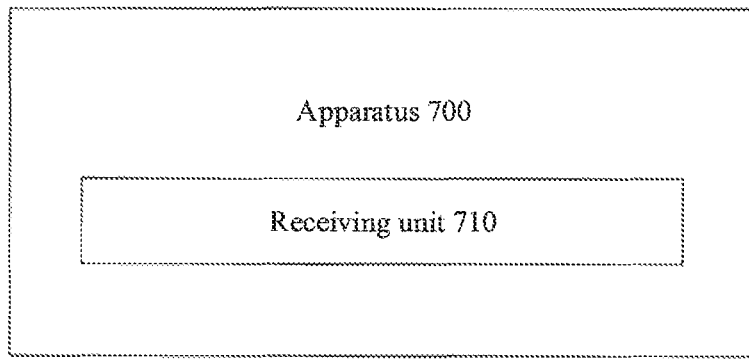
FIG. 7 is a schematic block diagram of a communications apparatus 700 according to an embodiment of this application.

FIG. 7 is a schematic block diagram of a communications apparatus 700 according to an embodiment of this application. As shown in FIG. 7, the apparatus 700 includes:

a receiving unit 710, configured to receive a fifth message sent by a terminal device, where the fifth message is used to instruct a first network device to stop communication with the terminal device, or the fifth message is used to instruct the first network device to release a protocol stack and a data radio bearer that are corresponding to the terminal device; and the apparatus is the first network device or a second network device.

Therefore, according to the wireless communications apparatus provided in this application, when determining that the terminal device needs to stop communication with the first network device or may release a protocol stack and a data radio bearer that are corresponding to the first network device, the terminal device cannot communicate with the first network device. To enable the first network device to also learn an action of the terminal device (or learn a communication status between the terminal device and the first network device), the terminal device sends the fifth message to the network device (the first network device or the second network device). The first network device determines that the first network device does not need to communicate with the terminal device, and stops communication with the terminal device or releases the protocol stack and the data radio bearer that are corresponding to the terminal device. This can reduce power consumption of the first network device and waste of air interface resources, and effectively improve flexibility in a communication process.

Optionally, the fifth message carries at least one of the following:

third radio resource control (RRC) information; or a fifth measurement report, where the fifth measurement report is used to indicate that quality of a channel between the terminal device and the first network device is lower than or equal to a threshold.

Optionally, the apparatus further includes:

a processing unit 720, configured to stop communication between the terminal device and the first network device, or release the protocol stack and the data radio bearer that are corresponding to the terminal device.

Optionally, the apparatus is the second network device, and the processing unit 720 is further configured to:

send a sixth message to the first network device based on the fifth message, where the sixth message is used to instruct the first network device to stop communication with the terminal device; or the sixth message is used to instruct the first network device to release the protocol stack and the data radio bearer that are corresponding to the terminal device.

Therefore, the second network device generates the sixth message based on the fifth message sent by the terminal device, and sends the sixth message to the first network device. In other words, the second network device forwards the received fifth message to the first network device in a form of the sixth message. If the terminal device cannot normally communicate with the first network device, this effectively avoids a case in which the first network device cannot learn whether to stop communication with the terminal device, or whether to release the protocol stack and the data radio bearer corresponding to the terminal device. This further improves flexibility in a communication process.

The wireless communications apparatus 700 may correspond to (for example, may be configured to or the apparatus may function as) the first network device or the second network device described in the method 400. Modules or units in the wireless communication information apparatus 700 are configured to perform the actions or processing processes performed by the first network device or the second network device in the method 300. To avoid repetition, details are not described herein again.

In this embodiment of this application, the apparatus 700 may be the network device. In this case, the apparatus 700 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 710 in the apparatus 500 shown in FIG. 5 may be corresponding to the transmitter.

Figure 8:
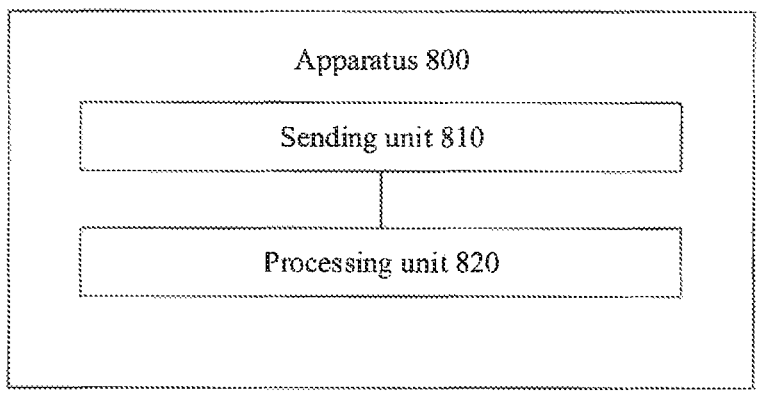
FIG. 8 is a schematic block diagram of a communications apparatus 800 according to an embodiment of this application.

FIG. 8 is a schematic block diagram of a communications apparatus 800 according to an embodiment of this application. As shown in FIG. 8, the apparatus 800 includes:

a sending unit 810, configured to send a fifth message to a network device, where the fifth message is used to instruct a first network device to stop communication with the apparatus, or the fifth message is used to instruct the first network device to release a protocol stack and a data radio bearer that are corresponding to the apparatus; and the network device is the first network device or a second network device; and a processing unit 820, configured to: after sending the fifth message, stop communication between the apparatus and the first network device, or release a protocol stack and a data radio bearer that are corresponding to the first network device.

Therefore, according to the wireless communications apparatus provided in this application, when determining that the apparatus needs to stop communication with the first network device or may release the protocol stack and the data radio bearer that are corresponding to the first network device, the apparatus cannot communicate with the first network device. To enable the first network device to also learn an action of the apparatus (or learn a communication status between the apparatus and the first network device), the apparatus sends the fifth message to the network device (the first network device or the second network device). The first network device determines that the first network device does not need to communicate with the apparatus, and stops communication with the apparatus or releases the protocol stack and the data radio bearer that are corresponding to the apparatus. This can reduce power consumption of the first network device and waste of air interface resources, and effectively improve flexibility in a communication process. In addition, after sending the fifth message, the apparatus also stops communication with the first network device or releases the protocol stack and the data radio bearer that are corresponding to the first network device. This also reduces power consumption of the apparatus for continuously listening to a channel, reduces waste of air interface resources, and effectively improves flexibility in a communication process.

Optionally, the processing unit 820 is further configured to: send the fifth information according to at least one of the following conditions. The at least one of the following conditions includes:

quality of a channel between the apparatus and the first network device is lower than or equal to a threshold;

a radio link failure occurs between the apparatus and the first network device; or a timer of the apparatus times out.

Optionally, the fifth message is a fifth measurement report, and the fifth measurement report is used to indicate that the quality of the channel between the apparatus and the first network device is lower than or equal to a threshold.

The wireless communications apparatus 800 may correspond to (for example, may be configured to or the apparatus may function as) the terminal device described in the method 400. Modules or units in the wireless communication information apparatus 800 are configured to perform the actions or processing processes performed by the terminal device in the method 400. To avoid repetition, details are not described herein again.

In this embodiment of this application, the apparatus 800 may be the terminal device. In this case, the apparatus 800 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 810 in the apparatus 800 shown in FIG. 8 may be corresponding to the transmitter, and the processing unit 820 in the apparatus 800 shown in FIG. 8 may be corresponding to the processor.

Figure 9:
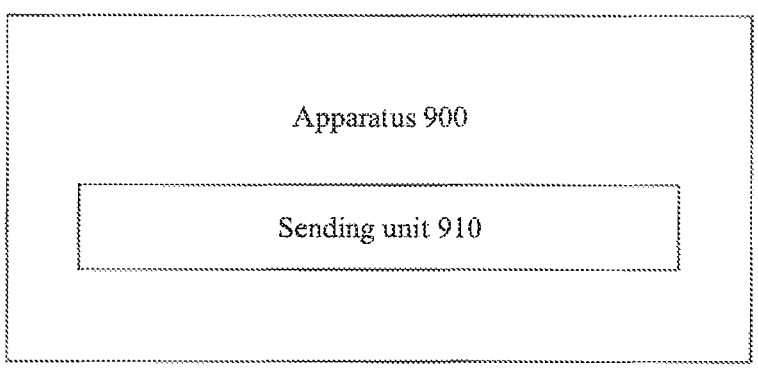
FIG. 9 is a schematic block diagram of a communications apparatus 900 according to an embodiment of this application.

FIG. 9 is a schematic block diagram of a communications apparatus 900 according to an embodiment of this application. As shown in FIG. 9, the apparatus 900 includes:

a sending unit 910, configured to send a second message to a first network device, where the second message is used to instruct the first network device to stop communication with a terminal device, or the second message is used to instruct the first network device to release a protocol stack and a data radio bearer that are corresponding to the terminal device.

Optionally, before the second network device sends the second message to the first network device, the apparatus further includes:

a receiving unit 920, configured to receive a second measurement report sent by the terminal device or the first network device, where the second measurement report is used to indicate that quality of a channel between the terminal device and the first network device is lower than a threshold.

Alternatively, the receiving unit 920 is specifically configured to receive a first data message sent by the first network device, where the first data message is used to instruct the first network device to stop sending a data packet to the terminal device.

The sending unit 910 is further configured to send the second message based on the second measurement report or the first data message.

The wireless communications apparatus 900 may correspond to (for example, may be configured to or the apparatus may function as) the first network device described in the method 200. Modules or units in the wireless communication information apparatus 500 are configured to perform the actions or processing processes performed by the first network device in the method 200. To avoid repetition, details are not described herein again.

In this embodiment of this application, the apparatus 900 may be the network device. In this case, the apparatus 900 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 910 in the apparatus 900 shown in FIG. 9 may be corresponding to the transmitter.

It should be understood that sequence numbers of the foregoing processes or steps are not construed as to imply that the processes or the steps are order dependent. The sequence of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of a technical solution. A person skilled in the art may use different methods to implement the described functions for each particular application, but it should not be considered that the implementation goes beyond the scope of this application.

It may be clearly understood by the person skilled in the art that, for convenience and brevity of description, for specific working processes of the system, apparatus, and unit described in the foregoing, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of a solution in this embodiment.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions, so that one computer device (which may be a personal computer, a server, a network device, or the like) is enabled to perform all or some of the steps in the method described in the embodiments of this application. The foregoing storage medium includes: various mediums that can store program code, such as a USB flash drive, a removable hard disk, a read-only memory (Read-Only Memory, ROM), a random access memory (Random Access Memory, RAM), a magnetic disk, and an optical disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A wireless communication method, applied to a communications system comprising a first network device, a second network device, and a terminal device, wherein the terminal device is communicatively connected to the first network device and the second network device respectively, the method comprising:
   sending, by the first network device, a first message to the terminal device, wherein the first message is used to determine that the terminal device releases a protocol stack and a data radio bearer that are corresponding to the first network device;
   wherein the first message carries the following:
      first radio resource control (RRC) information;
      a first media access control (MAC) control element (CE);
      a first data packet; and
      a first packet data convergence protocol (PDCP) control protocol data unit (PDU), wherein the first PDCP control PDU comprises a first number used to indicate a last data packet sent by the first network device,
   wherein before the sending, by the first network device, the first message to the terminal device, the method further comprises:
   receiving, by the first network device, a first measurement report sent by the terminal device or the second network device, wherein the first measurement report is used to indicate that quality of a channel between the terminal device and the first network device is lower than or equal to a threshold;
   sending, by the first network device, the last data packet cached by the first network device to the terminal device;
   stopping, by the first network device, sending a data packet to the terminal device; and
   receiving, by the first network device, a second message sent by the second network device, wherein the second message is used to instruct the first network device to release a protocol stack and a data radio bearer that are corresponding to the terminal device,
   wherein before the receiving, by the first network device, a second message sent by the second network device, the method further comprises:
   sending, by the first network device, a first data message to the second network device, wherein the first data message is used to instruct the first network device to stop sending a data packet to the terminal device; or
   sending, by the first network device, a second measurement report to the second network device, wherein the second measurement report is used to indicate that quality of a channel between the terminal device and the first network device is lower than or equal to a threshold.

2. A wireless communication method, applied to a communications system comprising a first network device, a second network device, and a terminal device, wherein the terminal device is communicatively connected to the first network device and the second network device respectively, the method comprising:

sending, by the second network device, a first message to the terminal device, wherein the first message is used to determine that the terminal device releases a protocol stack and a data radio bearer that are corresponding to the first network device;

wherein the following:

second radio resource control RRC information;

a second media access control MAC control element CE;

a third data packet; and a second packet data convergence protocol PDCP control protocol data unit PDU, wherein the second PDCP control PDU comprises a second number, and the second number is used to indicate a first data packet sent by the second network device, wherein before the sending, by the second network device, a first message to the terminal device, the method further comprises:

receiving, by the second network device, a third measurement report sent by the terminal device or the first network device, wherein the third measurement report is used to indicate that quality of a channel between the terminal device and the first network device is lower than or equal to a threshold;

receiving, by the second network device, a third message sent by the first network device, wherein the third message is used to instruct the first network device to release a protocol stack and a data radio bearer that are corresponding to the terminal device;

receiving, by the second network device, a second data message sent by the first network device, wherein the second data message is used to instruct the first network device to stop sending a data packet to the terminal device; and receiving, by the second network device, a first radio link failure message sent by the terminal device, wherein the first radio link failure message is used to indicate that a radio link failure occurs between the terminal device and the first network device.

3. The method according to claim 2, wherein the method further comprises:

sending, by the second network device, a fourth message to the first network device, wherein the fourth message is used to instruct the first network device to stop communication with the terminal device, or the fourth message is used to instruct the first network device to release a protocol stack and a data radio bearer 4 that are corresponding to the terminal device;

wherein before the sending, by the second network device, a fourth message to the first network device, the method further comprises:

receiving, by the second network device, a fourth measurement report sent by the terminal device or the first network device, wherein the fourth measurement report is used to indicate that quality of a channel between the terminal device and the first network device is lower than or equal to a threshold; or receiving, by the second network device, a second radio link failure message sent by the terminal device, wherein the second radio link failure message is used to indicate that a radio link failure occurs between the terminal device and the first network device; or receiving, by the second network device, a third data message sent by the first network device, wherein the third data message is used to instruct the first network device to stop sending a data packet to the terminal device.

4. A wireless communication method, applied to a communications system comprising a first network device, a second network device, and a terminal device, wherein the terminal device is communicatively connected to the first network device and the second network device respectively, and the method comprises:

receiving, by the terminal device, a first message sent by the first network device; and after receiving the first message, stopping, by the terminal device, communication with the first network device, or releasing a protocol stack and a data radio bearer that are corresponding to the first network device;

wherein the first information carries the following:

first radio resource control RRC information;

a first media access control MAC control element CE;

a first data packet; and a first packet data convergence protocol PDCP control protocol data unit PDU, wherein the first PDCP control PDU comprises a first number, and the first number is used to indicate a last data packet sent by the first network device.

5. The method according to claim 4, wherein the first message carries the first PDCP control PDU, and after receiving the first message, the stopping, by the terminal device, communication with the first network device, or releasing a protocol stack and a data radio bearer that are corresponding to the first network device comprises:

after receiving the data packet indicated by the first number and all data packets before the data packet indicated by the first number, stopping, by the terminal device, communication with the first network device, or releasing the protocol stack and the data radio bearer that are corresponding to the first network device.

6. The method according to claim 5, wherein the method further comprises:

sending, by the terminal device, a first measurement report to the first network device, wherein the first measurement report is used to indicate that quality of a channel between the terminal device and the first network device is lower than or equal to a threshold.

7. The method according to claim 4, wherein the first message carries the second PDCP control PDU, and after receiving the first message, the stopping, by the terminal device, communication with the first network device, or releasing a protocol stack and a data radio bearer that are corresponding to the first network device comprises:

after receiving the data packet indicated by the second number and all data packets before the data packet indicated by the second number, stopping, by the terminal device, communication with the first network device, or releasing the protocol stack and the data radio bearer that are corresponding to the first network device.

8. The method according to claim 7, wherein the method further comprises:

sending, by the terminal device, a first measurement report to the first network device, wherein the first measurement report is used to indicate that quality of a channel between the terminal device and the first network device is lower than or equal to a threshold.

9. A wireless communication method, applied to a communications system comprising a first network device, a second network device, and a terminal device, wherein the terminal device is communicatively connected to the first network device and the second network device respectively, and the method comprises:
- receiving, by the terminal device, a first message sent by the second network device; and
- after receiving the first message, releasing a protocol stack and a data radio bearer that are corresponding to the first network device,
- wherein the first information carries the following:
- second radio resource control RRC information;
- a second media access control MAC control element CE;
- a third data packet; and
- a second packet data convergence protocol PDCP control protocol data unit PDU, wherein the second PDCP control PDU comprises a second number, and the second number is used to indicate a first data packet sent by the second network device.

10. A wireless communication method, applied to a communications system comprising a first network device, a second network device, and a terminal device, wherein the terminal device is communicatively connected to the first network device and the second network device respectively, the method comprising:
- receiving, by the second network device, a fifth message sent by the terminal device, wherein the fifth message is used to instruct the first network device to release a protocol stack and a data radio bearer that are corresponding to the terminal device,
- wherein the fifth message carries the following:
  - third radio resource control RRC information; and
  - a fifth measurement report, wherein the fifth measurement report is used to indicate that quality of a channel between the terminal device and the first network device is lower than or equal to a threshold,
- wherein after the receiving, by the second network device, the fifth message sent by the terminal device, the method further comprises:
- sending, by the second network device, a sixth message to the first network device based on the fifth message, wherein the sixth message is used to instruct the first network device to release the protocol stack and the data radio bearer that are corresponding to the terminal device.

11. A wireless communication method, applied to a communications system comprising a first network device, a second network device, and a terminal device, wherein the terminal device is communicatively connected to the first network device and the second network device respectively, the method comprising:
- receiving, by the second network device, a fifth message sent by the terminal device, wherein the fifth message is used to instruct the first network device to release a protocol stack and a data radio bearer that are corresponding to the terminal device,
- wherein the fifth message carries the following:
  - third radio resource control RRC information; and
  - a fifth measurement report, wherein the fifth measurement report is used to indicate that quality of a channel between the terminal device and the first network device is lower than or equal to a threshold;
- wherein the first information carries the following:
- second radio resource control RRC information;
- a second media access control MAC control element CE;
- a third data packet; and
- a second packet data convergence protocol PDCP control protocol data unit PDU, wherein the second PDCP control PDU comprises a second number, and the second number is used to indicate a first data packet sent by the second network device.

* * * * *